United States Patent
Wang et al.

(10) Patent No.: US 10,902,211 B2
(45) Date of Patent: Jan. 26, 2021

(54) MULTI-MODELS THAT UNDERSTAND NATURAL LANGUAGE PHRASES

(71) Applicant: Samsung Electronics Co., Ltd., Suwon Si (KR)

(72) Inventors: Yu Wang, Mountain View, CA (US);
Yilin Shen, Mountain View, CA (US);
Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 16/390,241

(22) Filed: Apr. 22, 2019

(65) Prior Publication Data

US 2019/0332668 A1  Oct. 31, 2019

Related U.S. Application Data

(60) Provisional application No. 62/662,610, filed on Apr. 25, 2018.

(51) Int. Cl.
*G06F 40/30* (2020.01)
*G10L 19/00* (2013.01)
*G10L 15/18* (2013.01)

(52) U.S. Cl.
CPC .............. *G06F 40/30* (2020.01); *G10L 15/18* (2013.01); *G10L 19/00* (2013.01)

(58) Field of Classification Search
CPC .......... G06F 40/30; G10L 19/00; G10L 15/18
USPC ............................................................. 704/9
See application file for complete search history.

(56) References Cited

U.S. PATENT DOCUMENTS

| | | | |
|---|---|---|---|
| 10,170,107 B1 * | 1/2019 | Dreyer | G10L 15/26 |
| 10,229,680 B1 * | 3/2019 | Gillespie | G06F 40/295 |
| 10,366,690 B1 * | 7/2019 | Sarikaya | G10L 25/54 |
| 10,482,904 B1 * | 11/2019 | Hardie | G10L 25/87 |
| 10,600,406 B1 * | 3/2020 | Shapiro | G06F 40/30 |
| 10,685,669 B1 * | 6/2020 | Lan | G10L 15/1822 |

(Continued)

FOREIGN PATENT DOCUMENTS

| | | |
|---|---|---|
| CN | 108228820 | 6/2018 |
| CN | 108228820 A * | 6/2018 |

(Continued)

OTHER PUBLICATIONS

International Search Report in International Patent Application No. PCT/KR2019/005000, dated Aug. 2, 2019.

(Continued)

*Primary Examiner* — Edwin S Leland, III

(57) ABSTRACT

A system determines intent values based on an object in a received phrase, and detail values based on the object in the received phrase. The system determines intent state values based on the intent values and the detail values, and detail state values and an intent detail value based on the intent values and the detail values. The system determines other intent values based on the intent values and another object in the received phrase, and other detail values based on the detail values and the other object in the received phrase. The system determines a general intent value based on the other intent values, the other detail values, and the intent state values, and another intent detail value based on the other intent values, the other detail values, and the detail state values.

20 Claims, 10 Drawing Sheets

(56) References Cited

U.S. PATENT DOCUMENTS

| | | | | |
|---|---|---|---|---|
| 2014/0278413 | A1* | 9/2014 | Pitschel | G10L 15/22 704/243 |
| 2017/0323636 | A1* | 11/2017 | Xiao | G06N 3/08 |
| 2017/0372199 | A1* | 12/2017 | Hakkani-Tur | G06N 3/08 |
| 2018/0157638 | A1* | 6/2018 | Li | G06N 3/08 |
| 2019/0066670 | A1* | 2/2019 | White | G10L 15/28 |
| 2019/0179606 | A1* | 6/2019 | Thangarathnam | G06F 40/30 |
| 2019/0179607 | A1* | 6/2019 | Thangarathnam | G06F 3/167 |
| 2019/0259380 | A1* | 8/2019 | Biyani | G10L 15/22 |
| 2019/0332668 | A1* | 10/2019 | Wang | G06F 40/30 |

FOREIGN PATENT DOCUMENTS

| | | | |
|---|---|---|---|
| KR | 2017-0090127 A | | 1/2016 |
| KR | 20170090127 A | * | 8/2017 |

OTHER PUBLICATIONS

Written Opinion in International Patent Application No. PCT/KR2019/005000, dated Aug. 2, 2019.

Liu et al., "Attention-Based Recurrent Neural Network Models for Joint Intent Detection and Slot Filling," arXiv:1609.01454, Sep. 6, 2016 <retrieved from https://arxiv.org/abs/1609.01454 on Jul. 3, 2019>.

Wang et al., "A Bi-Model Based RNN Semantic Frame Parsing Model for Intent Detection and Slot Filling," NAACL HLT 2018, vol. 2, Jun. 1-6, 2018, New Orleans, Louisiana (9 pages).

Zhao et al., "Generative Encoder-Decoder Models for Task-Oriented Spoken Dialog Systems with Chatting Capability," SIGDIAL 2017 Conference, Aug. 15-17, 2017, Saarbrucken Germany (12 pages).

Wu et al., Google's Neural Machine Translation System: Bridging the Gap Between Human and Machine Translation, arXiv:1609.08144v2 [cs.CL], Sep. 26, 2016 <retrieved from https://arxiv.org/abs/1609.08144 on Jul. 3, 2019>.

* cited by examiner

MULTI-MODELS THAT UNDERSTAND NATURAL LANGUAGE PHRASES

CROSS-REFERENCE TO RELATED APPLICATIONS

This application claims the benefit of U.S. Provisional Patent Application 62/662,610 titled "A Bi-model based RNN Semantic Frame Parsing System and Method for Spoken Language Understanding Improvement," by Wang, et al., filed Apr. 25, 2018, the entire contents of which is incorporated herein by reference.

TECHNICAL FIELD

An embodiment relates in general to systems that understand natural language, and more particularly, to multi-model that understand natural language phrases.

BACKGROUND

An electronic device, such as a smart phone or a laptop computer, can include a personal digital assistant that helps the device's user with different tasks, such as setting an alarm, receiving weather forecasts, or reviewing news updates. The personal digital assistant may use a natural language understanding engine to understand a phrase that is spoken or otherwise input by a user. A user can input different phrases, such as "Flight from Denver to Philadelphia," that express the user's intent to find flight information. Therefore, a natural language understanding engine needs to perform two tasks: 1) understand the user's general intent, such as find flight information, and 2) understand the intent details, such as the flight departure city "Denver" and the flight arrival city "Philadelphia."

Many personal digital assistants use two machine-learning/rule-based models to perform these two tasks separately. Even if such a personal digital assistant performs one task correctly, the personal digital assistant will respond incorrectly to a user's input phrase if the personal digital assistant performs the other task incorrectly. For example, if a user says "Check the price of Apple," and a personal digital assistant identifies the general intent of "Check the price of . . . " as a request for a stock market price and identifies the intent detail of " . . . Apple" as the name of a fruit, then the personal digital assistant fails to respond correctly by attempting to provide the stock market price of a piece of fruit. Conversely, if the personal digital assistant identifies the general intent of "Check the price of . . . " as a request for a food price and identifies the intent detail of " . . . Apple" as a company name, then the personal digital assistant fails to respond correctly by attempting to provide a food price of a company.

SUMMARY

In one embodiment, a system understands natural language phrases. An intent encoder determines intent values based on an object in a received phrase. A detail encoder determines detail values based on the object in the received phrase. An intent decoder determines intent state values based on the intent values and the detail values. A detail decoder determines detail state values and an intent detail value based on the intent values and the detail values. The intent encoder determines other intent values based on the intent values and another object in the received phrase. The detail encoder determines other detail values based on the detail values and the other object in the received phrase. The intent decoder determines a general intent value based on the other intent values, the other detail values, and the intent state values. The detail decoder determines another intent detail value based on the other intent values, the other detail values, and the detail state values.

In another embodiment, a method understands natural language phrases. The method includes an intent encoder determining intent values based on an object in a received phrase, and a detail encoder determining detail values based on the object in the received phrase. The method also includes an intent decoder determining intent state values based on the intent values and the detail values, and a detail decoder determining detail state values and an intent detail value based on the intent values and the detail values. The method further includes the intent encoder determining other intent values based on the intent values and another object in the received phrase, and the detail encoder determining other detail values based on the detail values and the other object in the received phrase. The method additionally includes the intent decoder determining a general intent value based on the other intent values, the other detail values, and the intent state values, and the detail decoder determining another intent detail value based on the other intent values, the other detail values, and the detail state values.

In yet another embodiment, a computer program product comprises computer-readable program code that includes instructions to understand natural language phrases. The program code includes instructions for an intent encoder to determine intent values based on an object in a received phrase, and a detail encoder to determine detail values based on the object in the received phrase. The program code also further instructions for an intent decoder to determine intent state values based on the intent values and the detail values, and a detail decoder to determine detail state values and an intent detail value based on the intent values and the detail values. The program code includes additional instructions for the intent encoder to determine other intent values based on the intent values and another object in the received phrase, and the detail encoder to determine other detail values based on the detail values and the other object in the received phrase. The program code includes further instructions for the intent decoder to determine a general intent value based on the other intent values, the other detail values, and the intent state values, and the detail decoder to determine another intent detail value based on the other intent values, the other detail values, and the detail state values.

FIG. 1 depicts an example of multi-models 100 that understand natural language phrases. After a user says, "Buy Apple," a natural language understanding engine parses the user's phrase into "Buy" 102 and "Apple" 104. An intent encoder 106 at time step 1 converts dictionary numbers $x_1$ for "Buy" 102 into "buy" general intent numbers $h_1^1$, and a detail encoder 108 at time step 1 converts the dictionary numbers $x_1$ for "Buy" 102 into "buy" intent detail numbers $h_1^2$. An intent decoder 110 at time step 1 converts the "buy" general intent numbers $h_1^1$ and the "buy" intent detail numbers $h_1^2$ into "buy" intent state numbers $s_1^1$, and a detail decoder 112 at time step 1 converts the "buy" general intent numbers $h_1^1$ and the "buy" intent detail numbers $h_1^2$ into "buy" intent state numbers $s_1^2$, and an intent detail number $y_1^2$ that determines an intent detail tag $y_1^2$=0. The intent encoder 114 at time step 2 converts dictionary numbers $x_2$ for "Apple" 104 and the "buy" general intent numbers $h_1^1$ into "buy apple" general intent numbers $h_2^1$, and the detail encoder 116 at time step 2 converts the dictionary numbers $x_2$ for "Apple" 104 and the "buy" intent detail numbers $h_1^2$ into "apple" intent detail numbers $h_2^2$. The intent decoder 118 at time step 2 converts the "buy apple" general intent numbers $h_2^1$, the "apple" intent detail numbers $h_2^2$, and the "buy" intent state numbers $s_1^1$ into general intent values $y_2^1$, which determine the general intent class $y_{intent}^1$="a food order" or "a stock market purchase," and each general intent class includes its corresponding probabilities. The detail decoder 120 at time step 2 converts the "apple" general intent numbers $h_2^1$ and the "apple" intent detail numbers $h_2^2$, and the "buy" intent state numbers $s_1^2$ into intent detail numbers $y_2^2$ that determine an intent detail tag $y_2^2$="fruit name" or "company name," and each tag includes its corresponding probabilities. If the intent detail tag $y_2^2$="fruit name" is determined, then the natural language understanding engine determines the general intent class $y_{intent}^1$="a food order," and responds to the user with the reply, "When do you want to order delivery of the fruit apple?" If the intent detail tag $y_2^2$="company name" is determined, then the natural language understanding engine determines the general intent class $y_{intent}^1$="a stock market purchase," and responds to the user with the reply, "How much stock do you want to purchase in the company Apple?"

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which.

DETAILED DESCRIPTION

Figure 1:
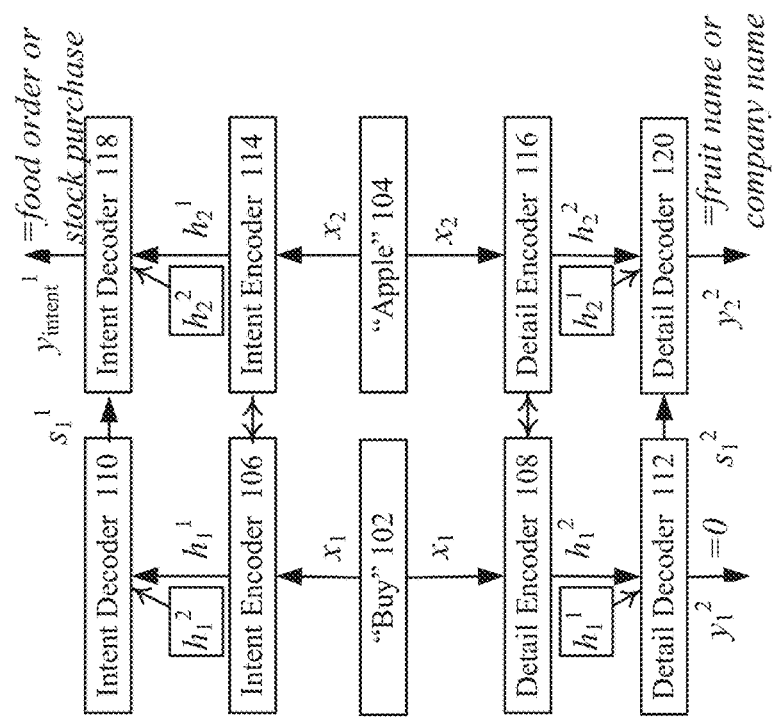
FIG. 1 illustrates example multi-models that understand natural language phrases according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation, including meanings implied from the specification as well as meanings understood by those skilled in the art and/or defined in dictionaries, treatises, etc.

The term "object" or "slot" generally refers to a word, a group of words, or a group of characters that represent a concept. The term "received phrase," or "utterance," is used to generally refer to a set of words that are input to a system and that include at least one verb and at least one noun. The term "received supplemental object" generally refers to a word, a group of words, or a group of characters that is also input to a system and represents a concept. The term "image object" is used to generally refer to a visual representation. The term "audio object" generally refers to any type of sound, such as speech or a recording, that is input to a system. The term "suggestion object" is used to generally refer to a word, a group of words, or a group of characters that represent a proposed concept.

The term "value" generally refers to a numerical amount, algebraic term, or a label. The term "general intent value" is used to generally refer to a numerical amount, algebraic term, or a label that is associated with a main purpose. The term "intent detail value" generally refers to a numerical amount, algebraic term, or a label that is associated with an attribute of a purpose.

The term "intent value" is used to generally refer to a numerical amount, algebraic term, or a label that is associated with a purpose. The term "detail value" generally refers to a numerical amount, algebraic term, or a label that is associated with an attribute of a purpose. The term "supplemental value" is used to generally refer to an additional numerical amount, algebraic term, or a label. The term "image value" generally refers to a numerical amount, algebraic term, or a label that is associated with a visual representation. The term "audio value" is used to generally refer to a numerical amount, algebraic term, or a label that is associated with any type of sound that is input to a system. The term "suggestion value" generally refers to a numerical amount, algebraic term, or a label that is associated with a proposal.

The term "intent state value" is used to generally refer to a numerical amount, algebraic term, or a label that is associated with a condition and a purpose. The term "detail state value" generally refers to a numerical amount, algebraic term, or a label that is associated with a condition and an attribute of a purpose. The term "supplemental state value" is used to generally refer to an additional numerical amount, algebraic term, or a label that is associated with a condition. The term "image state value" generally refers to a numerical amount, algebraic term, or a label that is associated with a condition and a visual representation. The term "audio state value" is used to generally refer to a numerical amount, algebraic term, or a label that is associated with a condition and any type of sound that is input to a system. The term "suggestion state value" generally refers to a numerical amount, algebraic term, or a label that is associated with a condition and a proposal.

The term "intent encoder" is used to generally refer to a circuit, software program, or algorithm that converts information that is associated with a purpose from one format or code to another. The term "detail encoder" generally refers to a circuit, software program, or algorithm that converts information that is associated with an attribute of a purpose from one format or code to another. The term "supplemental encoder" is used to generally refer to an additional circuit, software program, or algorithm that converts information from one format or code to another. The term "image encoder" generally refers to a circuit, software program, or algorithm that converts information that is associated with a visual representation from one format or code to another. The term "audio encoder" is used to generally refer to a circuit, software program, or algorithm that converts information that is associated with any type of sound from one format or code to another. The term "suggestion encoder" generally refers to a circuit, software program, or algorithm that converts information that is associated with a proposal from one format or code to another.

The term "intent decoder" is used to generally refer to a circuit, software program, or algorithm that converts signals that are associated with a purpose from one format or code to another. The term "detail decoder" generally refers to a circuit, software program, or algorithm that converts signals that are associated with an attribute of a purpose from one format or code to another. The term "supplemental decoder" is used to generally refer to an additional circuit, software program, or algorithm that converts signals from one format or code to another. The term "image decoder" generally refers to a circuit, software program, or algorithm that converts signals that are associated with a visual representation from one format or code to another. The term "audio decoder" is used to generally refer to a circuit, software program, or algorithm that converts signals that are associated with any type of sound from one format or code to another. The term "suggestion decoder" generally refers to a circuit, software program, or algorithm that converts signals that are associated with a proposal from one format or code to another.

The term "parameter" is used to generally refer to a numerical or other measurable factor forming a set that defines a system or sets the conditions of its operation. The term "difference" generally refers to a quantity by which amounts differ, or the remainder left after subtraction of one value from another. The term "verified general intent" is used to generally refer to a confirmed main purpose. The term "verified intent detail" generally refers to a confirmed attribute of a purpose. The term "response" is used to generally refer to a reaction to something.

Figure 2:
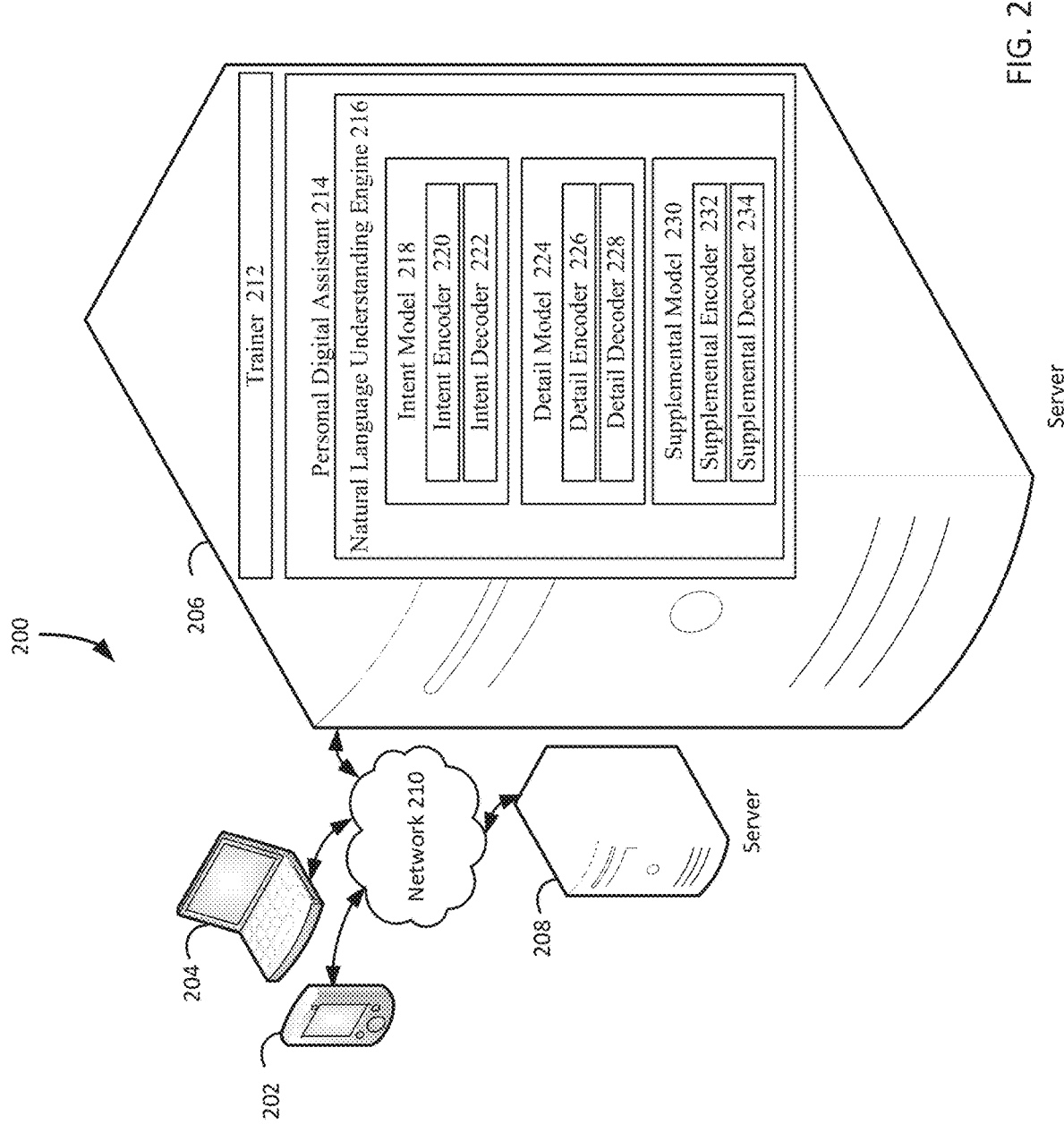
FIG. 2 illustrates a block diagram of an example system for multi-models that understand natural language phrases according to an embodiment.

FIG. 2 illustrates a block diagram of a system 200 for understanding natural language phrases according to an embodiment. As shown in FIG. 2, the system 200 may illustrate a cloud computing environment in which data, applications, services, and other resources are stored and delivered through shared data-centers and appear as a single point of access for the end users. The system 200 may also represent any other type of distributed computer network environment in which servers control the storage and distribution of resources and services for different client users.

In an embodiment, the system 200 represents a cloud computing system that includes a first client 202, a second client 204, and a first server 206 and a second server 208 that may be provided by a hosting company. The clients 202-204 and the servers 206-208 communicate via a network 210. While FIG. 2 depicts the first client 202 as a smartphone 202 and the second client 204 as a laptop computer 204, each of the clients 202-204 may be any type of computer. The first server 206, which may be referred to a natural language server 206, includes components 212-234 in an embodiment. Although FIG. 2 depicts the system 200 with two clients 202-204, two servers 206-208, and one network 210, the system 200 may include any number of clients 202-204, any number of servers 206-208, and/or any number of networks 210. The clients 202-204 and the servers 206-208 may each be substantially similar to the system 1000 depicted in FIG. 10 and described below.

The system components 212-234, each of which may be combined into larger components and/or divided into smaller components, include a trainer 212, a personal digital assistant 214, and a natural language understanding engine 216. The natural language understanding engine 216 includes an intent model 218, which includes an intent encoder 220 and an intent decoder 222, a detail model 224, which includes an detail encoder 226 and a detail decoder 228, and a supplementary model 230, which includes a supplementary encoder 232 and a supplementary decoder 234. FIG. 2 depicts the system components 212-234 residing completely on the natural language server 206, but the system components 212-234 may reside completely on the natural language server 206, completely on the second server 208, completely on the clients 202-204, or in any combination of partially on the servers 206-208, and partially on the clients 202-204. For example, after the natural language server 206 uses the trainer 212 to train the natural language understanding engine 216 in the personal digital assistant 214, the natural language server 206 can provide a copy of the personal digital assistant 214 to the smartphone 202.

The natural language understanding engine 216 can understand natural language phrases that are incomplete sentences rather than natural language sentences because when interacting with the personal digital assistant 214, a person is more likely to input an incomplete sentence phrase such as "Flight from Denver to Philadelphia" instead of inputting a sentence such as "I want information about a flight from Denver to Philadelphia." Furthermore, if the natural language understanding engine 216 is sufficiently trained to understand an incomplete sentence phrase such as "Flight from Denver to Philadelphia," then the natural language understanding engine 216 is sufficiently trained to understand a complete sentence that includes an complete sentence phrase, such as "I want information about a flight from Denver to Philadelphia."

Figure 3:
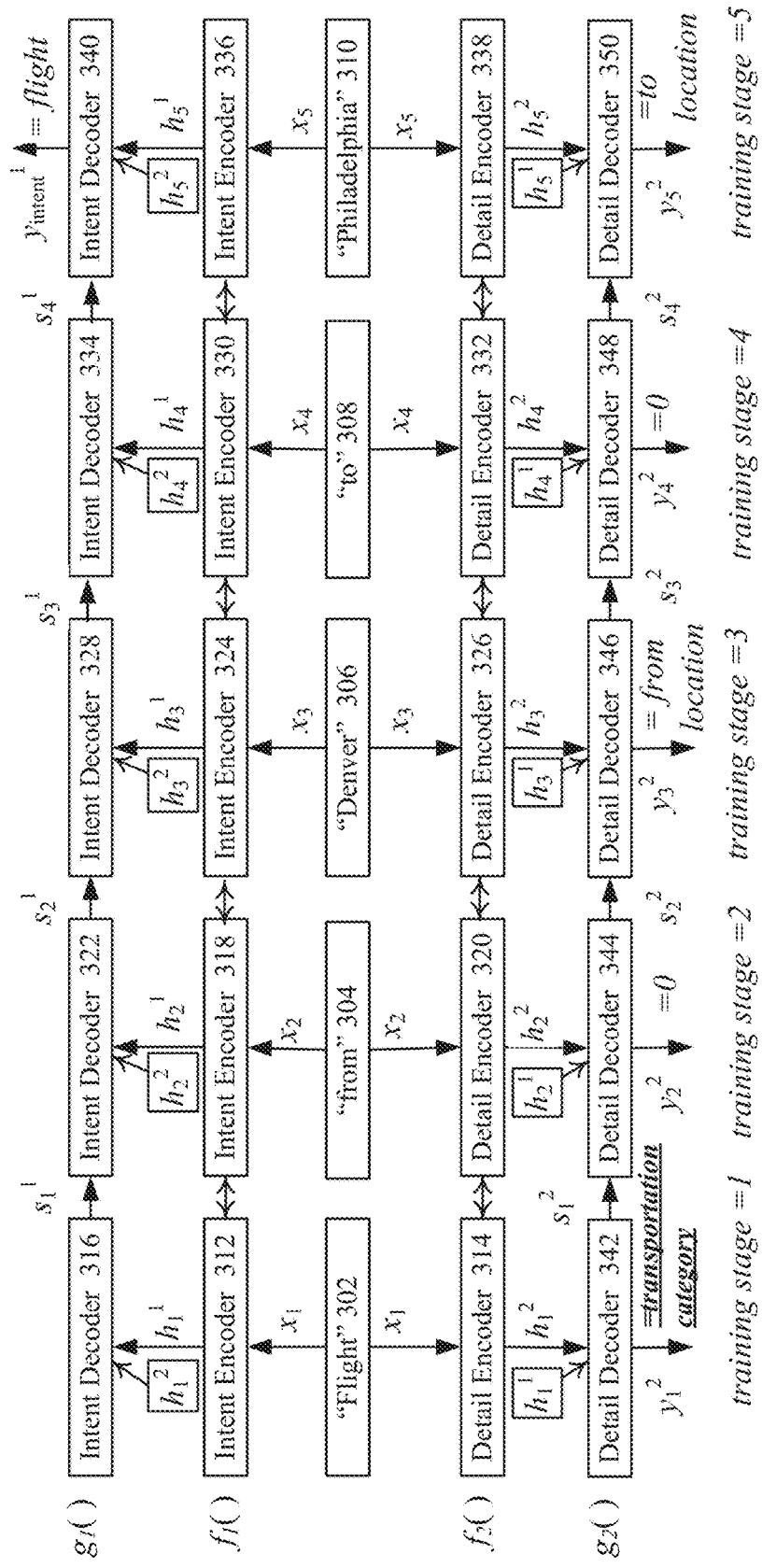
FIG. 3 illustrates an example bi-model structure that is trained to understand natural language phrases according to an embodiment.

FIG. 3 illustrates a block diagram of a bi-model structure 300, which includes decoders, for training to understand natural language phrases according to an embodiment. The natural language server 206 can have multiple neural based encoder-decoder models, such as a general intent detection task network and an intent detail detection task network, which may be referred to as a slot tag detection task network or a slot filling detection task network. The bi-model structure 300 includes bi-directional encoders for the general intent detection task network and bi-directional encoders for the intent detail detection task network. The bi-model structure 300 can use Bi-directional Long Short-Term Memory (BLSTM) to implement corresponding encoders and Long Short-Term Memory (LSTM) to implement the corresponding decoders.

Each encoder reads an object (typically a word) of the sequence of objects $(x_1, x_2, \ldots x_t)$ parsed from a received phrase forwards and backwards. Then the encoder neural network for the general intent detection task generates the hidden states $h_t^1$, and the encoder neural network for the intent detail detection task generates the hidden states $h_t^2$. Unlike personal digital assistant systems that separately train a general intent model and an intent detail model, the natural language server 206 uses the general intent model and the intent detail model together by sharing each model's hidden states with the other model. For example, the original hidden state $h_t^1$ from the intent encoder $f_1$ is concatenated with $h_{t-1}^2$ from the intent detail encoder $f_2$, and then fed into the intent decoder $g_1$. Similarly, for the intent detail model, the hidden state $h_t^2$ from its detail encoder $f_2$ is concatenated with the hidden state $h_{t-1}^1$ from the intent encoder $f_1$, and then fed into the detail decoder $g_2$. Hence, the BLSTM generates sequences of hidden states $(h_1^i, h_2^i, \ldots h_t^i)$, where i=1 corresponds to the general intent detection task network and i=2 corresponds to the intent detail detection task network. In order to detect the general intent, the hidden state $h^1$ from the intent encoder $f_1$ is combined together with the hidden state $h^2$ from the intent detail encoder $f_2$ to generate the state $s^1$ $$s_t^1 \phi(s_{t-1}^1, h_{t-1}^1, h_{t-1}^2)$$

$$y_{intent}^1 = \arg \max(\hat{y}_t^1) P(\hat{y}_t^1 | s_{t-1}^1, h_{t-1}^1, h_{t-1}^2)$$

where $\hat{y}_t^1$ contains the predicted probabilities for all general intent classes at the last training stage t.

Similarly, in order to detect the intent details, the hidden state $h^2$ from the intent detail encoder $f_2$ is combined together with the hidden state $h^1$ from the intent encoder $f_1$ to generate the state $s^2$. However, the intent detail decoder $f_2$ will generate an output $y_t^2$ at each training stage t as if solving a sequence labeling problem. At each training stage t:

$$s_t^2 = \psi(h_{t-1}^2, h_{t-1}^1, s_{t-1}^2, y_{t-1}^2)$$

$$y_t^2 = \arg \max(\hat{y}_t^2) P(\hat{y}_t^2 | h_{t-1}^2, h_{t-1}^1, s_{t-1}^2, y_{t-1}^2)$$

where $y_t^2$ is the detected intent detail tag at training stage t.

The natural language server 206 can train multiple task networks using their own loss functions with shared hidden state parameters. In each training iteration, both the general intent detection task network and the intent detail detection task network generate a group of hidden states $h_t^1$ and $h_t^2$ from their models in previous iterations. The general intent detection task network reads in a batch of input data $x_i$ and hidden states $h_t^2$, and then it generates the general intent class $y_{intent}^1$.

For example, after a system administrator says, "Flight from Denver to Philadelphia," the natural language understanding engine 216 parses the system administrator's phrase into "Flight" 302, "from" 304, "Denver" 306, "to" 308, and "Philadelphia" 310. The intent encoder 312 at training stage 1 converts dictionary numbers $x_1$ for "Flight" 302 into "flight" general intent numbers $h_1^1$, and the detail encoder 314 at training stage 1 converts the dictionary numbers $x_1$ for "Flight" 302 into "flight" intent detail numbers $h_1^2$. The dictionary numbers $x_i$ for an object, such as "Flight" 302, are numerical representations of meanings for the object, such as the word "flight," which can be converted by an algorithm based on other words in the same phrase as the object to $h_i^1$ and $h_i^2$, which are other numerical representations of meanings for the object. The values $x_1, x_2, h_i^1, h_i^2, s_1^1$, and $s_1^2$ for an object, such as the word "Flight" 302, may be expressed as a vector of any dimension, such as 200. The intent decoder 316 at training stage 1 converts the "flight" general intent numbers $h_1^1$ and the "flight" intent detail numbers $hO^2$ into "flight" intent state numbers $s_1^1$.

The intent encoder 318 at training stage 2 converts dictionary numbers $x_2$ for "from" 304 and the "flight" general intent numbers $h_1^1$ and intent detail number $h_1^2$ into "flight from" general intent numbers $h_2^1$, and the detail encoder 320 at training stage 2 converts the dictionary numbers $x_2$ for "from" 304 and the "flight" general intent numbers $h_1^1$ and intent detail numbers $h_1^2$ into "from" intent detail numbers $h_2^2$. The intent decoder 322 at training stage 2 converts the "flight from" general intent numbers $h_2^1$, the "from" intent detail numbers $h_2^2$, and the "flight" intent state numbers $s_1^1$ into "flight from" intent state numbers $s_2^1$.

The intent encoder 324 at training stage 3 converts dictionary numbers $x_3$ for "Denver" 306 and the "flight from" general intent numbers $h_2^1$ and intent detail number $h_2^2$ into "flight from Denver" general intent numbers $h_3^1$, and the detail encoder 326 at training stage 3 converts the dictionary numbers $x_3$ for "Denver" 306 and the "from" intent detail numbers $h_2^2$ into "Denver" intent detail numbers $h_3^2$. The intent decoder 328 at training stage 3 converts the "flight from Denver" general intent numbers $h_3^1$, the "Denver" intent detail numbers $h_3^2$, and the "from" intent state numbers $s_2^1$ into "flight from Denver" intent state numbers $s_3^1$.

The intent encoder 330 at training stage 4 converts dictionary numbers $x_4$ for "to" 308 and the "flight from Denver" general intent numbers $h_3^1$ and intent detail number $h_3^2$ into "flight from Denver to" general intent numbers $h_4^1$, and the detail encoder 332 at training stage 4 converts the dictionary numbers $x_4$ for "to" 308 and the "Denver" intent detail numbers $h_3^2$ into "to" intent detail numbers $h_4^2$. The intent decoder 334 at training stage 4 converts the "flight from Denver to" general intent numbers $h_4^1$, the "to" intent detail numbers $h_4^2$, and the "flight from Denver" intent state numbers $s_3^1$ into "flight from Denver to" intent state numbers $s_4^1$.

The intent encoder 336 at training stage 5 converts dictionary numbers $x_5$ for "Philadelphia" 310 and the "flight from Denver to" general intent numbers $h_4^1$ and intent detail number $h_4^2$ into "flight from Denver to Philadelphia" general intent numbers $h_5^1$, and the detail encoder 338 at training stage 5 converts the dictionary numbers $x_5$ for "Philadelphia" 310 and the "to" intent detail numbers $h_4^2$ into "Philadelphia" intent detail numbers $h_5^2$. The intent decoder 340 at training stage 5 converts the "flight from Denver to Philadelphia" general intent numbers $h_5^1$, the "Philadelphia" intent detail numbers $h_5^2$, and the "flight from Denver to" intent state numbers $s_4^1$ into general intent numbers $\hat{y}_5^1$, which determine a general intent class $y_{intent}^1$ = "flight," which includes the general intent class' corresponding probability. The intent encoder at the training stages 1-5 (312, 318, 324, 330, and 336) is an example of the intent encoder 220 in the intent model 218, and the intent decoder at the training stages 1-5 (316, 322, 328, 334, and 340) is an example of the intent decoder 222 in the intent model 218.

The intent decoder at the last training stage in a general intent model determines the general intent for a received phrase by identifying which of the general intent numbers $\hat{y}_t^1$ that corresponds to the greatest probability, which determines the corresponding general intent with the general intent class $y_{intent}^1$. An example of the intent decoder in a general intent model determining a general intent is described below in reference to FIG. 4 as $y_{intent}^1$="check fruit price" or "check stock price."

The natural language server 206 computes the general intent detection task network cost based on function $L_1$ and trains the general intent detection task network on the general intent detection task network cost. $L_1$ is defined using cross entropy as:

$$L_1 \triangleq -\Sigma_{i=1}^{k} \hat{y}_{intent}^{1,i} \log(y_{intent}^{1,i})$$

where k is the number of general intent class types.

In the FIG. 3 example, $y_{intent}^1$="flight," and a system administrator or an algorithm verifies the general intent class "flight" for the phrase "Flight from Denver to Philadelphia." Therefore, the calculation of the loss function, or cost function, which is a function of the difference between estimated and true values for an instance of data, will result in minimal, if any, changes in the parameters for the intent encoder or the intent decoder. In other examples that result in a difference between the determined general intent values and the verified general intent values, such a difference can result in any amount of changes in the parameters for the intent encoder and/or the intent decoder.

Next, the natural language server 206 provides the same batch of data $x_t$ to the intent detail detection task network together with the hidden state $h_t^1$ from the general intent detection task network, which enables the intent detail detection task network to generate a batch of outputs $y_t^2$ for training stage 2.

Continuing the example depicted in FIG. 3, the detail decoder 342 at the training stage 1 converts the "flight" general intent numbers $h_1^1$ and the "flight" intent detail numbers $h_1^2$ into "flight" detail state numbers $s_1^2$ and intent detail numbers $\hat{y}_1^2$ that determine an intent detail tag $y_1^2$="0." A detail decoder in an intent detail model determines an intent detail for an object from a received phrase by determining whether the one of the intent detail numbers $\hat{y}_n^2$ that corresponds to the greatest probability has a probability that is greater than an intent detail probability threshold, and then tagging the corresponding intent detail with the intent detail tag $y_n^2$. However, in some instances where multiple intent detail numbers $\hat{y}_t^2$ correspond to probabilities that are greater than the intent detail probability threshold, a detail decoder can tag multiple corresponding intent details with the intent detail tag $y_n^2$. An example of a detail decoder in a detail model determining and tagging an intent detail is described below in reference to FIG. 4 as $y_5^2$="fruit name" or $y_5^2$="company name."

The detail decoder 344 at the training stage 2 converts the "flight from" general intent numbers $h_2^1$, the "from" intent detail numbers $h_2^2$, and the "flight" detail state numbers $s_1^2$ into "from" detail state numbers $s_2^2$ and intent detail numbers $\hat{y}_2^2$ that determine an intent detail tag $y_2^2$=0. The detail decoder 346 at the training stage 3 converts the "flight from Denver" general intent numbers $h_3^1$, the "Denver" intent detail numbers $h_3^2$, and the "from" detail state numbers $s_2^2$ into "Denver" detail state numbers $s_3^2$ and intent detail numbers $\hat{y}_3^2$ that determine an intent detail tag $y_3^2$="from location." The detail decoder 348 at the training stage 4 converts the "flight from Denver to" general intent numbers $h_4^1$, the "to" intent detail numbers $h_4^2$, and the "Denver" detail state numbers $s_3^2$ into "to" detail state numbers $s_4^2$ and intent detail numbers $\hat{y}_4^2$ that determine the intent detail tag $y_4^2$=0. The detail decoder 350 at the training stage 5 converts the "flight from Denver to Philadelphia" general intent numbers $h_5^1$, the "Philadelphia" intent detail numbers $h_5^2$, and the "to" detail state numbers $s_4^2$ into intent detail numbers $\hat{y}_5^2$ that determine an intent detail tag $y_5^2$="to location." The detail encoder at the training stages 1-5 (314, 320, 326, 332, and 338) is an example of the detail encoder 226 in the detail model 224, and the detail decoders at the training stages 1-5 (342, 344, 346, 348, and 350) is an example of the detail decoder 226 in the detail model 224.

Then the natural language server 206 computes the intent detail detection task network cost based on function $L_2$ and trains the intent detail detection task network on the intent detail detection task network cost. $L_2$ is defined using cross entropy as:

$$L_2 \triangleq -\Sigma_{j=1}^{n} \Sigma_{i=1}^{m} \hat{y}_j^{2,i} \log(y_j^{2,i})$$

where m is the number of intent detail tag types and n is the number of objects (words) in the phrase.

In the FIG. 3 example, $y_1^2$="0," $y_3^2$="from location," $y_5^2$="to location," and a system administrator or an algorithm verifies only the intent detail tags "from location" and "to location" for the phrase "Flight from Denver to Philadelphia." Therefore, the calculation of the loss function, or cost function, will result in changes in the parameters for the detail encoder and/or the detail decoder to reduce the probabilities of generating the intent detail tag $y_1^2$="0." In other examples that result in no difference between the determined intent detail values and the verified intent detail values, there are minimal, if any, amounts of changes in the parameters for the detail encoder and/or the detail decoder.

The natural language server 206 uses asynchronous training because of the importance of keeping the two separate cost functions for the two different tasks. The natural language server 206 filters the negative impact between the two tasks, thereby overcoming the structural limitation of one model. The cross-impact between the two tasks can only be learned by sharing the hidden states of the two models, which are trained separately using the two cost functions. The performance of all tasks can be improved by reducing the error of each task and learning the useful shared information.

Figure 4:
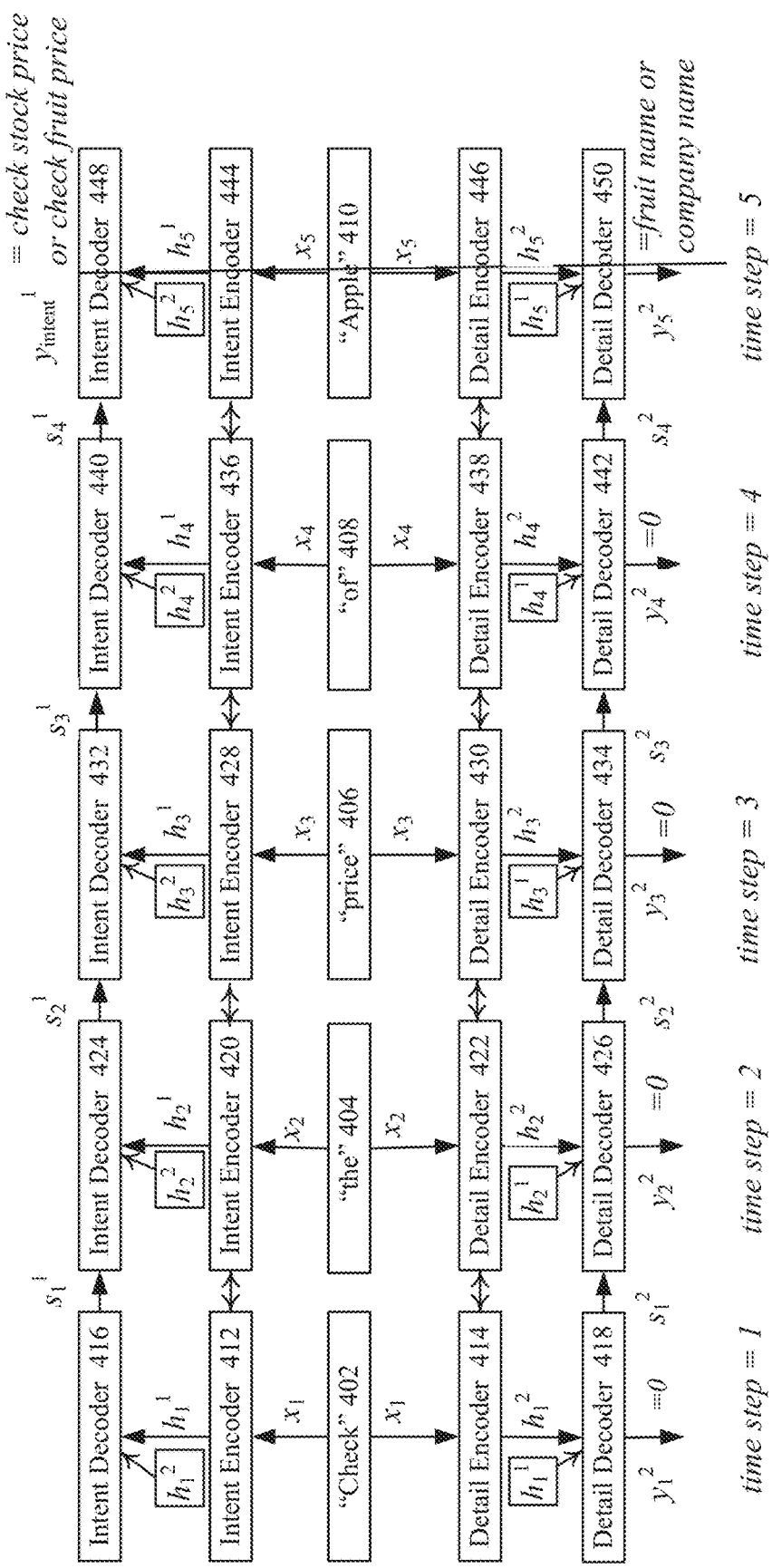
FIG. 4 illustrates an example bi-model structure that understands natural language phrases according to an embodiment.

FIG. 4 illustrates a block diagram of a bi-model structure 400, which includes decoders, for understanding natural language phrases according to an embodiment. After a user says, "Check the price of Apple," the natural language understanding engine 216 parses the user's phrase into "Check" 402, "the" 404, "price" 406, "of" 408, and "Apple" 410. The intent encoder 412 at time step 1 converts dictionary numbers $x_1$ for "Check" 402 into "check" general intent numbers $h_1^1$, and the detail encoder 414 at time step 1 converts the dictionary numbers $x_1$ for "Check" 402 into "check" intent detail numbers $h_1^2$. The intent decoder 416 at time step 1 converts the "check" general intent numbers $h_1^1$ and the "check" intent detail numbers $h_1^2$ into "check" intent state numbers $s_1^1$, and the detail decoder 418 at time step 1 converts the "check" general intent numbers $h_1^1$ and the "check" intent detail numbers $h_1^2$ into "check" detail state numbers $s_1^2$ and intent detail numbers $\hat{y}_1^2$ that determine an intent detail tag $y_1^2$=0.

The intent encoder 420 at time step 2 converts dictionary numbers $x_2$ for "the" 404, the "check" general intent numbers $h_1^1$, and the intent detail numbers $h_1^2$ into "check the" general intent numbers $h_2^1$, and the detail encoder 422 at time step 2 converts the dictionary numbers $x_2$ for "the" 404, the "check" intent detail numbers $h_1^2$, and the general intent numbers $h_1^1$ into "the" intent detail numbers $h_2^2$. The intent decoder 424 at time step 2 converts the "check the" general intent numbers $h_2^1$, the "the" intent detail numbers $h_2^2$, and the "check" intent state numbers $s_1^1$ into "check the" intent state numbers $s_2^1$, and the detail decoder 426 at time step 2 converts the "check the" general intent numbers $h_2^1$, the "the" intent detail numbers $h_2^2$, and the "check" detail state numbers $s_1^2$ into "the" detail state numbers $s_2^2$ and intent detail numbers $\hat{y}_2^2$ that determine the intent detail tag $y_2^2=0$.

The intent encoder 428 at time step 3 converts dictionary numbers $x_3$ for "price" 406, the "check the" general intent numbers $h_2^1$, and the intent detail numbers $h_2^2$ into "check the price" general intent numbers $h_3^1$, and the detail encoder 430 at time step 3 converts the dictionary numbers $x_3$ for "price" 406, the "the" intent detail numbers $h_2^2$, and the general intent numbers $h_2^1$ into "price" intent detail numbers $h_3^2$. The intent decoder 432 at time step 3 converts the "check the price" general intent numbers $h_3^1$, the "price" intent detail numbers $h_3^2$, and the "check the" intent state numbers $s_2^1$ into "check the price" intent state numbers $s_3^1$, and the detail decoder 434 at time step 3 converts the "check the price" general intent numbers $h_3^1$, the "price" intent detail numbers $h_3^2$, and the "the" detail state numbers $s_2^2$ into "price" detail state numbers $s_3^2$ and intent detail numbers $\hat{y}_3^2$ that determine an intent detail tag $y_3^2=0$.

The intent encoder 436 at time step 4 converts dictionary numbers $x_4$ for "of" 408, the "check the price" general intent numbers $h_3^1$, and the intent detail numbers $h_3^2$ into "check the price of" general intent numbers $h_4^1$, and the detail encoder 438 at time step 4 converts the dictionary numbers $x_4$ for "of" 408, the "price" intent detail numbers $h_3^2$, and the general intent numbers $h_3^1$ into "of" intent detail numbers $h_4^2$. The intent decoder 440 at time step 4 converts the "check the price of" general intent numbers $h_4^1$, the "of" intent detail numbers $h_4^2$, and the "check the price" intent state numbers $s_3^1$ into "check the price of" intent state numbers $s_4^1$, and the detail decoder 442 at time step 4 converts the "check the price of" general intent numbers $h_4^1$, the "of" intent detail numbers $h_4^2$, and the "price" detail state numbers $s_3^2$ into "of" detail state numbers $s_4^2$ and intent detail numbers $\hat{y}_4^2$ that determine an intent detail tag $y_4^2=0$.

The intent encoder 444 at time step 5 converts dictionary numbers $x_5$ for "Apple" 410, the "check the price of" general intent numbers $h_4^1$, and the intent detail numbers $h_4^2$ into "check the price of Apple" general intent numbers $h_5^1$, and the detail encoder 446 at time step 5 converts the dictionary numbers $x_5$ for "Apple" 310, the "of" intent detail numbers $h_4^2$, and the general intent numbers $h_4^1$ into "Apple" intent detail numbers $h_5^2$. The intent decoder 448 at time step 5 converts the "check the price of Apple" general intent numbers $h_5^1$, the "Apple" intent detail numbers $h_5^2$, and the "check the price of" intent state numbers $s_4^1$ into general intent numbers $\hat{y}_5^1$ that determine the general intent class $y_{intent}^1$="check stock price" or "check fruit price," which include each general intent class' corresponding probabilities, and the detail decoder 450 at time step 5 converts the "check the price of Apple" general intent numbers $h_5^1$, the "Apple" intent detail numbers $h_5^2$, and the "of" detail state numbers $s_4^2$ into intent detail numbers $\hat{y}_5^2$ that determine an intent detail tag $y_5^2$="company name" or "fruit name," which includes each tag's corresponding probabilities. Then the natural language understanding engine 216 can respond to the user with the reply, "Do you want to know the fruit price of an apple or the stock market price of the company Apple?" In contrast to a typical personal digital assistant that uses two unrelated models to implement the separate general intent task and intent detail task for understanding natural language phrases, the bi-model structure 400 executes the two tasks concurrently, which improves the performance of each task by sharing the useful information between the two task networks. Consequently, the bi-model structure 400 enables the personal digital assistant 214 to understand ambiguous natural language phrases better than typical personal digital assistants.

Figure 5:
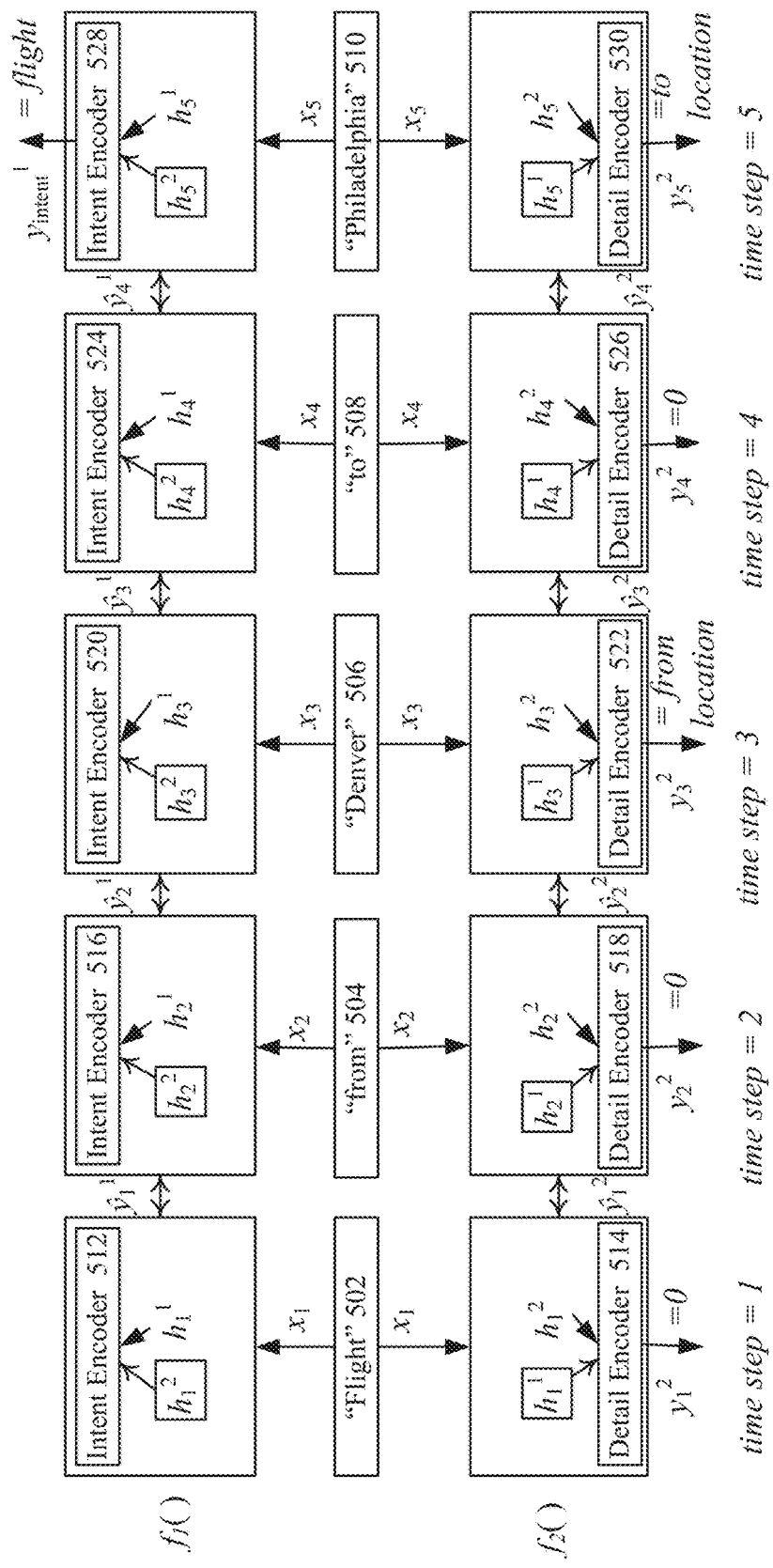
FIG. 5 illustrates an example bi-model structure, without decoders, that understands natural language phrases according to an embodiment.

FIG. 5 illustrates a block diagram of a bi-model structure 500, which does not include decoders, for understanding natural language phrases according to an embodiment. In this bi-model structure 500, there are no decoders as in the previous bi-model structures 300 and 400. The encoder for the general intent detection task generates only one detected general intent class $y_{intent}^1$ at the last time step n, where n equals the number of objects (words) in the received phrase. The state value $y_t^1$ and the general intent class $y_{intent}^1$ are generated as:

$$h_t^1 = \phi(h_{t-1}^1, h_{t-1}^2)$$

$$y_{intent}^1 = \arg\max(\hat{y}_n^1) P(\hat{y}_n^1 | h_{n-1}^1, h_{n-1}^2)$$

For the intent detail detection task, the basic structure of the encoder is similar to the encoder for the general intent detection task, except that there is one intent detail tag $y_t^2$ generated at each time step t. The intent detail encoder also takes the hidden states $h_{t-1}^1$ and $h_{t-1}^2$ from two encoders plus the intent detail tag $y_{t-1}^2$ to generate the next state value $h_t^2$ and the intent detail tag $y_t^2$. These are represented mathematically as:

$$h_t^2 = \psi(h_{t-1}^2, h_{t-1}^1, y_{t-1}^2)$$

$$y_t^2 = \arg\max(\hat{y}_t^2) P(\hat{y}_t^2 | h_{t-1}^2, h_{t-1}^1, y_{t-1}^2)$$

For example, FIG. 5 illustrates a block diagram of a bi-model structure 500, which excludes decoders, for understanding natural language phrases according to an embodiment. After a user says, "Flight from Denver to Philadelphia," the natural language understanding engine 216 parses the user's phrase into "Flight" 502, "from" 504, "Denver" 506, "to" 508, and "Philadelphia" 510. The intent encoder 512 at time step 1 converts dictionary numbers $x_1$ for "Flight" 502 into "flight" general intent numbers $h_1^1$, and the detail encoder 514 at time step 1 converts the dictionary numbers $x_1$ for "Flight" 502 into "flight" intent detail numbers $h_1^2$. The intent encoder 512 at time step 1 converts the "flight" general intent numbers $h_1^1$ and the "flight" intent detail numbers $h_1^2$ "flight" general intent state numbers $\hat{y}_1^1$, and the detail encoder 514 at time step 1 converts the "flight" general intent numbers $h_1^1$ and the "flight" intent detail numbers $h_1^2$ into a "flight" intent detail state numbers $\hat{y}_1^2$ that determine an intent detail tag $y_1^2=0$.

The intent encoder 516 at time step 2 converts dictionary numbers $x_2$ for "from" 504 and the "flight" general intent state numbers $\hat{y}_1^1$ into "flight from" general intent numbers $h_2^1$, and the detail encoder 518 at time step 2 converts the dictionary numbers $x_2$ for "from" 504 and the "flight" intent detail state numbers $\hat{y}_1^2$ into "from" intent detail numbers $h_2^2$. The intent encoder 516 at time step 2 converts the "flight from" general intent numbers $h_2^1$ and the "from" intent detail numbers $h_2^2$ into "flight from" general intent state numbers $\hat{y}_2^1$, and the detail encoder 518 at time step 2 converts the "flight from" general intent numbers $h_2^1$ and the "from" intent detail numbers $h_2^2$ into "from" intent detail state numbers $\hat{y}_2^2$ that determine an intent detail tag $y_2^2=0$.

The intent encoder 520 at time step 3 converts dictionary numbers $x_3$ for "Denver" 506 and the "flight from" general intent state numbers $\hat{y}_2^1$ into "flight from Denver" general intent numbers $h_3^1$, and the detail encoder 522 at time step 3 converts the dictionary numbers $x_3$ for "Denver" 506 and the "from" intent detail state numbers $\hat{y}_2^2$ into "Denver" intent detail numbers $h_2^2$. The intent encoder 520 at time step 3 converts the "flight from Denver" general intent numbers $h_3^1$ and the "Denver" intent detail numbers $h_3^2$ into "flight from Denver" general intent state numbers $\hat{y}_3^1$, and the detail encoder 522 at time step 3 converts the "flight from Denver" general intent numbers $h_3^1$ and the "Denver" intent detail numbers $h_3^2$ into "Denver" detail state numbers $\hat{y}_3^2$ that determine an intent detail tag $y_3^2$="from location."

The intent encoder 524 at time step 4 converts dictionary numbers $x_4$ for "to" 508 and the "flight from Denver" general intent state numbers $\hat{y}_3^1$ into "flight from Denver to" general intent numbers $h_4^1$, and the detail encoder 526 at time step 4 converts the dictionary numbers $x_4$ for "to" 508 and the "Denver" intent detail numbers $h_3^2$ into "to" intent detail numbers $h_4^2$. The intent encoder 524 at time step 4 converts the "flight from Denver to" general intent numbers $h_4^1$ and the "to" intent detail numbers $h_4^2$ into "flight from Denver to" general intent state numbers $\hat{y}_4^1$, and the detail encoder 526 at time step 4 converts the "flight from Denver to" general intent numbers $h_4^1$ and the "to" intent detail numbers $h_4^2$ into "to" intent detail state numbers $\hat{y}_4^2$ that determine an intent detail tag $y_4^2$=0.

The intent encoder 528 at time step 5 converts dictionary numbers $x_5$ for "Philadelphia" 510 and the "flight from Denver to" general intent state numbers $\hat{y}_4^1$ into "flight from Denver to Philadelphia" general intent numbers $h_5^1$, and the detail encoder 530 at time step 5 converts the dictionary numbers $x_5$ for "Philadelphia" 510 and the "to" intent detail state numbers $\hat{y}_4^2$ into "Philadelphia" intent detail numbers $h_5^2$. The intent encoder 528 at time step 5 converts the "flight from Denver to Philadelphia" general intent numbers $h_5^1$ and the "Philadelphia" intent detail numbers $h_5^2$ into general intent state numbers $\hat{y}_5^1$ that determine a general intent class $y_{intent}^1$="flight." The detail encoder 530 at time step 5 converts the "flight from Denver to Philadelphia" general intent numbers $h_5^1$ and the "Philadelphia" intent detail numbers $h_5^2$ into detail state numbers $\hat{y}_5^2$ that determine an intent detail tag $y_5^2$="to location."

The previous examples are based on the bi-model structure—two models with shared hidden state information that are trained asynchronously for two correlated tasks. This concept can be further extended to the cases where multiple models are trained asynchronously for one task or multiple correlated tasks. In addition to the general intent model and the intent detail model, the natural language server 206 can add another model to learn from the given training data, by sharing its hidden states with the general intent model and the intent detail model. Similarly, the hidden states of the general intent model and the intent detail model can also be shared with this new model by concatenating the hidden states from the three models. These three models can also be trained asynchronously as described before.

For example, the main target of a visual-based query answering task is to find an answer to a question that is based on a given image. Typical models take the image features and question features concurrently as its input and train them together. The natural language understanding engine 214 takes multiple types of data using different models, trained asynchronously and finds their internal cross-impacts on each other. For example, the question "How many surfers?" has a strong correlation with a given image that depicts four people at a beach, including one person who is holding a surfboard and another person who is standing on a surfboard while surfing. The natural language understanding engine 216 responds to the question by identifying "how many surfers" in the image, which can be shown by an attention map using different approaches, such as by tagging 3 people in the image who are identified as surfers with a surfer 1 tag, a surfer 2 tag, and a surfer 3 tag. The natural language understanding engine 216 can provide an attention map, mark the target people, and answer correctly, which is beyond the capability of typical natural language understanding engines.

Figure 6:
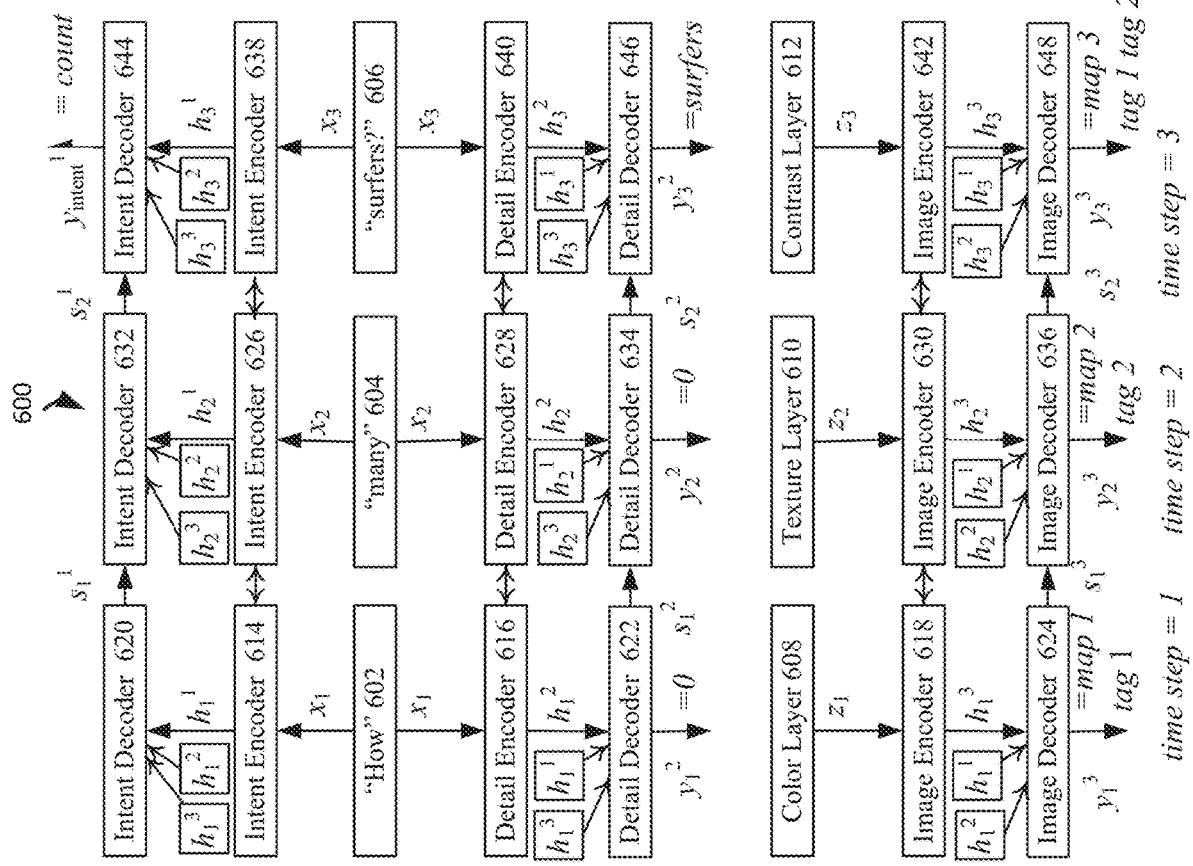
FIG. 6 illustrates an example tri-model structure, including an image model, that understands natural language phrases according to an embodiment.

FIG. 6 illustrates a block diagram of a tri-model structure 600, which includes an image model, for understanding natural language phrases according to an embodiment. After a user says, "How many surfers?" and provides an image of four people at a beach, the natural language understanding engine 216 parses the user's phrase into "How" 602, "many" 604, and "surfers" 606, and divides the image into a color layer 608, a texture layer 610, and a contrast layer 612. The intent encoder 614 at time step 1 converts dictionary numbers $x_1$ for "How" 602 into "how" general intent numbers $h_1^1$, the detail encoder 616 at time step 1 converts the dictionary numbers $x_1$ for "how" 602 into "how" intent detail numbers $h_1^2$, and the image encoder at time step 1 618 converts the dictionary numbers $z_1$ for a color layer 608 into color image numbers $h_1^3$. The intent decoder 620 at time step 1 converts the "how" general intent numbers $h_1^1$, the "how" intent detail numbers $h_1^2$, and the color image numbers $h_1^3$ into "how" intent state numbers $s_1^1$. The detail decoder 622 at time step 1 converts the "how" general intent numbers $h_1^1$, the "how" intent detail numbers $h_1^2$, and the color image numbers $h_1^3$ into "how" detail state numbers $s_1^2$ and intent detail numbers $\hat{y}_1^2$ that determine an intent detail tag $y_1^2$=0. The image decoder 622 at time step 1 converts the "how" general intent numbers $h_1^1$, the "how" intent detail numbers $h_1^2$, and the color image numbers $h_1^3$ into "how" image state numbers $s_1^3$ and a color attention map 1 $y_1^3$ that is tagged with a surfer 1 tag.

The intent encoder 626 at time step 2 converts dictionary numbers $x_2$ for "many" 604 and the "how" general intent numbers $h_1^1$ into "how many" general intent numbers $h_2^1$, the detail encoder 628 at time step 2 converts the dictionary numbers $x_2$ for "many" 604 and the "how" intent detail numbers $h_1^2$ into "many" intent detail numbers $h_2^2$, and the image encoder 630 at time step 2 converts the dictionary numbers $z_2$ for a texture layer 610 and the color image numbers $h_1^3$ into texture image numbers $h_2^3$. The intent decoder 632 at time step 2 converts the "how many" general intent numbers $h_2^1$, the "many" intent detail numbers $h_2^2$, the texture image numbers $h_2^3$, and the "how" intent state numbers $s_1^1$ into "how many" intent state numbers $s_2^1$. The detail decoder 634 at time step 2 converts the "how many" general intent numbers $h_2^1$, the "many" intent detail numbers $h_2^2$, the texture image numbers $h_2^3$, and the "how" detail state numbers $s_1^2$ into "many" detail state numbers $s_2^2$ and "many" intent detail numbers $\hat{y}_2^2$ that determine an intent detail tag $y_2^2$=0. The image decoder 636 at time step 2 converts the "how many" general intent numbers $h_2^1$, the "many" intent detail numbers $h_2^2$, the texture image numbers $h_2^3$, and the "how" image state numbers $s_1^3$ into "many" image state numbers $s_2^3$ and a texture attention map 2 $y_2^3$ that is tagged with a surfer 2 tag.

The intent encoder 638 at time step 3 converts dictionary numbers $x_3$ for "surfers" 606 and the "how many" general intent numbers $h_2^1$ into "how many surfers" general intent numbers $h_3^1$, the detail encoder 640 at time step 3 converts the dictionary numbers $x_3$ for "surfers" 606 and the "many" intent detail numbers $h_2^2$ into "surfers" intent detail numbers $h_3^2$, and the image encoder 642 at time step 3 converts the dictionary numbers $z_3$ for a contrast layer 612 and the "many" image numbers $h_2^3$ into contrast image numbers $h_3^3$. The intent decoder 644 at time step 3 converts the "how many surfers" general intent numbers $h_3^1$, the "surfers"

intent detail numbers $h_3^2$, the contrast image numbers $h_3^3$, and the "many" intent state numbers $s_2^1$ into "how many surfers" general intent state numbers $\hat{y}_3^1$, which determine a general intent class $y_{intent}^1$="count." The detail decoder 646 at time step 3 converts the "how many surfers" general intent numbers $h_3^1$, the "surfers" intent detail numbers $h_3^2$, the contrast image numbers $h_3^3$, and the "many" detail state numbers $s_2^2$ into "surfers" intent detail numbers $\hat{y}_3^2$ that determine an intent detail tag $y_3^2$="surfers." The image decoder 648 at time step 3 converts the "how many surfers" general intent numbers $h_3^1$, the "surfers" intent detail numbers $h_3^2$, the contrast image numbers $h_3^3$, and the texture image numbers $s_2^3$ into a contrast attention map 3 $y_3^3$ that is tagged with a surfer 1 tag and a surfer 2 tag. The image encoder at the time steps 1-3 (618, 630, and 642) is an example of the supplemental encoder 232 in the supplemental model 230, and the image decoder at the time steps 1-3 (624, 636, and 648) is an example of the supplemental decoder 234 in the supplemental model 230. Then the natural language understanding engine 216 can respond to the user with a count of "2 surfers" in the image provided by the user and use the attention maps 1-3 to identify the location of the tagged surfers 1 and 2, possibly by overlaying the attention maps 1-3 on each other. Although FIG. 6 depicts an image model within a tri-model structure, the image model may be incorporated as one model within a bi-model structure, with the other model combining the general intent model and the intent detail model into a text model. In contrast to the models used by typical personal digital assistants, which take an image and a natural language phrase concurrently as its input and train them together. the tri-model structure 600 can take these types of data using different models, trained asynchronously and find their internal cross-impacts on each other, hence providing more accurate results.

Figure 7:
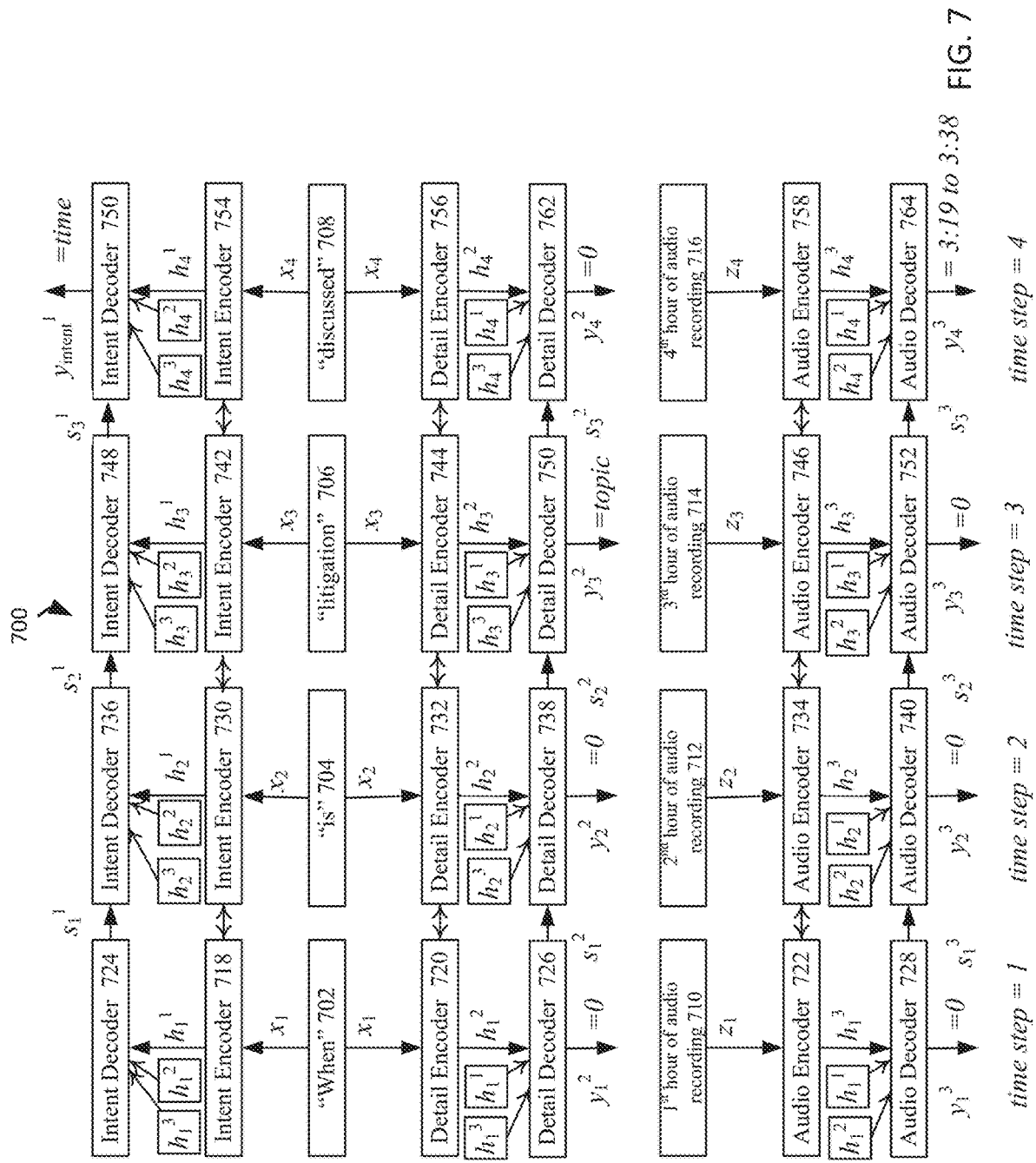
FIG. 7 illustrates an example tri-model structure, including an audio model, that understands natural language phrases according to an embodiment.

FIG. 7 illustrates a block diagram of a tri-model structure 700, which includes an audio recording model, for understanding natural language phrases according to an embodiment. For this example, a system user wants to listen to every portion of a four-hour long audio recording during which litigation was discussed, without having to listen to the entire recording. After a user says, "When is litigation discussed," the natural language understanding engine 216 parses the user's phrase into "When" 702, "is" 704, "litigation" 706, and "discussed" 708, and parses the audio recording into a first hour of the audio recording 710, a second hour of the audio recording 712, a third hour of the audio recording 714, and a fourth hour of the audio recording 716. The intent encoder 718 at time step 1 converts dictionary numbers $x_1$ for "When" 702 into "when" general intent numbers $h_1^1$, the detail encoder 720 at time step 1 converts the dictionary numbers $x_1$ for "when" 702 into "when" intent detail numbers $h_1^2$, and the audio encoder 722 at time step 1 converts the audio numbers $z_1$ for the first hour of the audio recording 710 into first hour audio numbers $h_1^3$. The intent decoder 724 at time step 1 converts the "when" general intent numbers $h_1^1$, the "when" intent detail numbers $h_1^2$, and the first hour audio numbers $h_1^3$ into "when" intent state numbers $s_1^1$. The detail decoder 726 at time step 1 converts the "when" general intent numbers $h_1^1$, the "when" intent detail numbers $h_1^2$, and the first hour audio numbers $h_1^3$ into "when" detail state numbers $s_1^2$ and intent detail numbers $\hat{y}_1^2$ that determine an intent detail tag $y_1^2$=0. The audio decoder 728 at time step 1 converts the "when" general intent numbers $h_1^1$, the "when" intent detail numbers $h_1^2$, and the first hour audio numbers $h_1^3$ into first hour audio state numbers $s_1^3$ and first hour audio numbers $\hat{y}_1^3$ that determine a first hour audio tag $y_1^3$=0.

The intent encoder 730 at time step 2 converts dictionary numbers $x_2$ for "is" 704 and the "when" general intent numbers $h_1^1$ into "when is" general intent numbers $h_2^1$, the detail encoder 732 at time step 2 converts the dictionary numbers $x_2$ for "is" 704 and the "when" intent detail numbers $h_1^2$ into "is" intent detail numbers $h_2^2$, and the audio encoder 734 at time step 2 converts the audio numbers $z_2$ for the second hour of the audio recording 712 and the first hour audio numbers $h_1^3$ into second hour audio numbers $h_2^3$. The intent decoder 736 at time step 2 converts the "when is" general intent numbers $h_2^1$, the "is" intent detail numbers $h_2^2$, the second hour audio numbers $h_2^3$, and the "when" intent state numbers $s_1^1$ into "when is" intent state numbers $s_2^1$. The detail decoder at time step 2 738 at time step 2 converts the "when is" general intent numbers $h_2^1$, the "is" intent detail numbers $h_2^2$, the second hour audio numbers $h_2^3$, and the "when" detail state numbers $s_1^2$ into "is" detail state numbers $s_2^2$ and intent detail numbers $\hat{y}_2^2$ that determine an intent detail tag $y_2^2$=0. The audio decoder 740 at time step 2 converts the "when is" general intent numbers $h_2^1$, the "is" intent detail numbers $h_2^2$, the second hour audio numbers $h_2^3$, and the first hour audio state numbers $s_1^3$ into second hour audio state numbers $s_2^3$ and intent detail numbers $\hat{y}_2^3$ that determine an intent detail tag $y_2^3$=0.

The intent encoder 742 at time step 3 converts dictionary numbers $x_3$ for "litigation" 706 and the "when is" general intent numbers $h_2^1$ into "when is litigation" general intent numbers $h_3^1$, the detail encoder 744 at time step 3 converts the dictionary numbers $x_3$ for "litigation" 706 and the "is" intent detail numbers $h_2^2$ into "litigation" intent detail numbers $h_3^2$, and the audio encoder 746 at time step 3 converts the audio numbers $z_3$ for the third hour of the audio recording 714 and the second hour audio numbers $h_2^3$ into third hour audio numbers $h_3^3$. The intent decoder 748 at time step 3 converts the "when is litigation" general intent numbers $h_3^1$, the "litigation" intent detail numbers $h_3^2$, the third hour audio numbers $h_3^3$, and the "when is" intent state numbers $s_2^1$ into "when is litigation" intent state numbers $s_3^1$. The detail decoder 750 at time step 3 converts the "when is litigation" general intent numbers $h_3^1$, the "litigation" intent detail numbers $h_3^2$, the third hour audio numbers $h_3^3$, and the "is" detail state numbers $s_2^2$ into "litigation" intent state numbers $s_3^2$ and intent detail numbers $\hat{y}_3^2$ that determine an intent detail tag $y_3^2$="topic." The audio decoder 752 at time step 3 converts the "when is litigation" general intent numbers $h_3^1$, the "litigation" intent detail numbers $h_3^2$, the third hour audio numbers $h_3^3$, and the second hour audio state numbers $s_2^3$ into third hour audio state numbers $s_3^3$, and third hour audio numbers $\hat{y}_3^3$ that determine a third hour audio tag $y_3^3$=0.

The intent encoder 754 at time step 4 converts dictionary numbers $x_4$ for "discussed" 708 and the "when is litigation" general intent numbers $h_3^1$ into "when is litigation discussed" general intent numbers $h_4^1$, the detail encoder 756 at time step 4 converts the dictionary numbers $x_4$ for "discussed" 708 and the "litigation" intent detail numbers $h_3^2$ into "discussed" intent detail numbers $h_4^2$. and the audio encoder 758 at time step 4 converts the audio numbers $z_4$ for the fourth hour of the audio recording 716 and the third hour audio numbers $h_3^3$ into fourth hour audio numbers $h_4^3$. The intent decoder 760 at time step 4 converts the "when is litigation discussed" general intent numbers $h_4^1$, the "discussed" intent detail numbers $h_4^2$, the fourth hour audio numbers $h_4^3$, and the "when is litigation" intent state numbers $s_3^1$ into "when is litigation discussed" general intent numbers $\hat{y}_4^1$, which determine a general intent class $y_{intent}^1$="time." The detail decoder 762 at time step 4 converts the "when is litigation discussed" general intent numbers $h_4^1$, the "discussed" intent detail numbers $h_4^2$, the fourth hour audio numbers $h_4^3$, and the "litigation" detail state numbers $s_3^2$ into "discussed" intent detail numbers $\hat{y}_4^2$, which determine an intent detail tag $y_4^2$=0. The audio decoder 764 at time step 4 converts the "when is litigation discussed" general intent numbers $h_4^1$, the "discussed" intent detail numbers $h_4^2$, the fourth hour audio numbers $h_4^3$, and the third hour audio state numbers $s_3^3$ into fourth hour audio numbers $\hat{y}_4^3$, which determine a fourth hour audio tag $y_4^3$="3:19 to 3:38." Then the natural language understanding engine 216 can respond to the user with the reply "the audio recording includes a discussion of litigation from 3:19 to 3:38," thereby saving the user more than three hours of time that would have been spent listening to the first three hours and 19 minutes of the audio recording. Although FIG. 7 depicts an audio model within a tri-model structure, the audio model may be incorporated as one model within a bi-model structure, with the other model combining the general intent model and the intent detail model into a text model.

Figure 8:
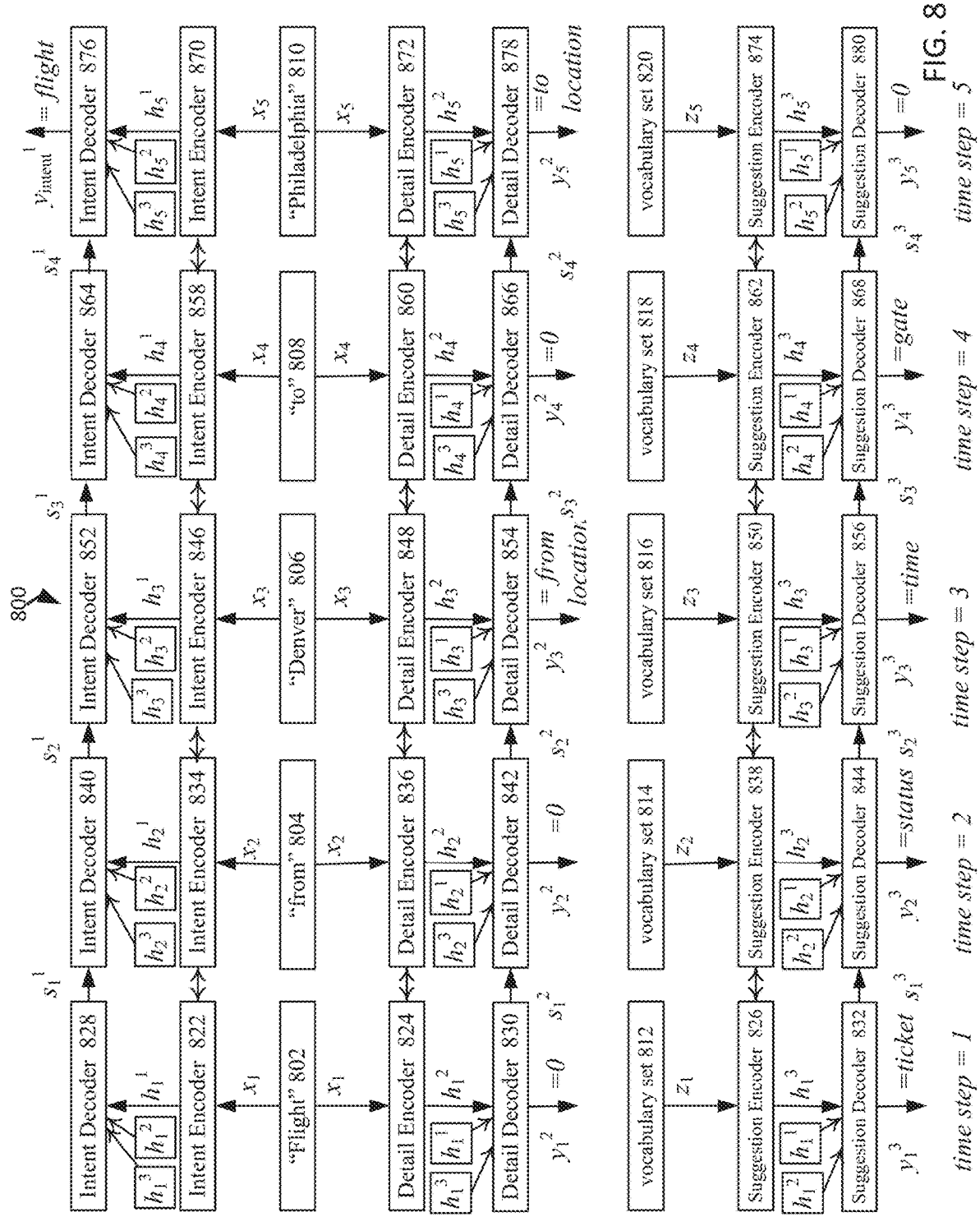
FIG. 8 illustrates an example tri-model structure, including an automatic-suggestion model that understands natural language phrases according to an embodiment.

FIG. 8 illustrates a block diagram of a tri-model structure 800, which includes an language model, for understanding natural language phrases according to an embodiment. After a user enters the text, "Flight from Denver to Philadelphia," the natural language understanding engine 216 parses the user's phrase into "Flight" 802, "from" 804, "Denver" 806, "to" 808, and "Philadelphia" 810, and uses a language model for automatic-suggestions to select the predicted word from a vocabulary set 812 at time step 1, the vocabulary set 814 at time step 2, the vocabulary set 816 at time step 3, the vocabulary set 818 at time step 4, and the vocabulary set 820 at time step 5 based on the previous words. The intent encoder at time step 1 822 converts dictionary numbers $x_1$ for "Flight" 802 into "flight" general intent numbers $h_1^1$, the detail encoder 824 at time step 1 converts the dictionary numbers $x_1$ for "Flight" 802 into "flight" intent detail numbers $h_1^2$, and the suggestion encoder 826 at time step 1 converts the dictionary numbers $z_1$ for the vocabulary set 812 at time step 1 into first vocabulary numbers $h_1^3$. The intent decoder 828 at time step 1 converts the "flight" general intent numbers $h_1^1$, the "flight" intent detail numbers $h_1^2$, and the first vocabulary numbers $h_1^3$ into "flight" intent state numbers $s_1^1$. The detail decoder 830 at time step 1 converts the "flight" general intent numbers $h_1^1$, the "flight" intent detail numbers $h_1^2$, and the first vocabulary numbers $h_1^3$ into "flight" detail state numbers $s_1^2$. and "flight" intent detail numbers $\hat{y}_1^2$ that determine an intent detail tag $y_1^2$=0. The suggestion decoder 832 at time step 1 converts the "flight" general intent numbers $h_1^1$, the "flight" intent detail numbers $h_1^2$, and the first vocabulary numbers $h_1^3$ into first vocabulary suggestion state numbers $s_1^3$ and first vocabulary numbers $\hat{y}_1^3$ that determine a first vocabulary tag $y_1^3$="ticket."

The intent encoder 834 at time step 2 converts dictionary numbers $x_2$ for "from" 804 and the "flight" general intent numbers $h_1^1$ into "flight from" general intent numbers $h_2^1$, the detail encoder 836 at time step 2 converts the dictionary numbers $x_2$ for "from" 804 and the "flight" intent detail numbers $h_1^2$ into "from" intent detail numbers $h_2^2$, and the suggestion encoder 838 at time step 2 converts the dictionary numbers $z_2$ for the vocabulary set 814 at time step 2 and the first vocabulary numbers $h_1^3$ into second vocabulary numbers $h_2^3$. The intent decoder 840 at time step 2 converts the "flight from" general intent numbers $h_2^1$, the "from" intent detail numbers $h_2^2$, the second vocabulary numbers $h_2^3$, and the "flight" intent state numbers $s_1^1$ into "flight from" intent state numbers $s_2^1$. The detail decoder 842 at time step 2 converts the "flight from" general intent numbers $h_2^1$, the "from" intent detail numbers $h_2^2$, the second vocabulary numbers $h_2^3$, and the "flight" detail state numbers $s_1^2$ into "from" detail state numbers $s_2^2$ and "from" intent detail numbers $\hat{y}_2^2$ that determine an intent detail tag $y_2^2$=0. The suggestion decoder 844 at time step 2 converts the "flight from" general intent numbers $h_2^1$, the "from" intent detail numbers $h_2^2$, the second vocabulary numbers $h_2^3$, and the first vocabulary state numbers $s_1^3$ into second vocabulary state numbers $s_2^3$ and second vocabulary numbers $\hat{y}_2^3$ that determine a second vocabulary tag $y_2^3$="status."

The intent encoder 846 at time step 3 converts dictionary numbers $x_3$ for "Denver" 806 and the "flight from" general intent numbers $h_2^1$ into "flight from Denver" general intent numbers $h_3^1$, the detail encoder 848 at time step 3 converts the dictionary numbers $x_3$ for "Denver" 306 and the "from" intent detail numbers $h_2^2$ into "Denver" intent detail numbers $h_3^2$, and the suggestion encoder 850 at time step 3 converts the dictionary numbers $z_3$ for the vocabulary set 816 at time step 3 and the second vocabulary numbers $h_2^3$ into third vocabulary numbers $h_3^3$. The intent decoder 852 at time step 3 converts the "flight from Denver" general intent numbers $h_3^1$, the "Denver" intent detail numbers $h_3^2$, the third vocabulary numbers $h_3^3$, and the "from" intent state numbers $s_2^1$ into "flight from Denver" intent state numbers $s_3^1$. The detail decoder 854 at time step 3 converts the "flight from Denver" general intent numbers $h_3^1$, the "Denver" intent detail numbers $h_3^2$, the third vocabulary numbers $h_3^3$, and the "from" detail state numbers $s_2^2$ into "Denver" detail state numbers $s_3^2$ and "Denver" intent detail numbers $\hat{y}_3^2$ that determine an intent detail tag $y_3^2$="from location." The suggestion decoder 856 at time step 3 converts the "flight from Denver" general intent numbers $h_3^1$, the "Denver" intent detail numbers $h_3^2$, the third vocabulary numbers $h_3^3$, and the second vocabulary state numbers $s_2^3$ into third vocabulary state numbers $s_3^3$ and third vocabulary numbers $\hat{y}_3^3$ that determine a third vocabulary tag $y_3^3$="time."

The intent encoder 858 at time step 4 converts dictionary numbers $x_4$ for "to" 808 and the "flight from Denver" general intent numbers $h_3^1$ into "flight from Denver to" general intent numbers $h_4^1$, the detail encoder 860 at time step 4 converts the dictionary numbers $x_4$ for "to" 808 and the "Denver" intent detail numbers $h_3^2$ into "to" intent detail numbers $h_4^2$, and the suggestion encoder 862 at time step 4 converts the dictionary numbers $z_4$ for the vocabulary set 818 at time step 4 and the third vocabulary numbers $h_3^3$ into fourth vocabulary numbers $h_4^3$. The intent decoder 864 at time step 4 converts the "flight from Denver" general intent numbers $h_4^1$, the "to" intent detail numbers $h_4^2$, the fourth vocabulary numbers $h_4^3$, and the "flight from Denver" intent state numbers $s_3^1$ into "flight from Denver to" intent state numbers $s_4^1$. The detail decoder 866 at time step 4 converts the "flight from Denver to" general intent numbers $h_4^1$, the "to" intent detail numbers $h_4^2$, the fourth vocabulary numbers $h_4^3$, and the "flight" detail state numbers $s_3^2$ into "to" detail state numbers $s_4^2$ and "to" intent detail numbers $\hat{y}_4^2$ that determine an intent detail tag $y_4^2$=0. The suggestion decoder 868 at time step 4 converts the "flight from Denver to" general intent numbers $h_4^1$, the "to" intent detail numbers $h_4^2$, the fourth vocabulary numbers $h_4^3$, and the third vocabulary state numbers $s_3^3$ into fourth vocabulary state numbers $s_4^3$ and fourth vocabulary numbers $\hat{y}_4^3$ that determine a fourth vocabulary tag $y_4^3$="gate."

The intent encoder 870 at time step 5 converts dictionary numbers $x_5$ for "Philadelphia" 810 and the "flight from Denver to" general intent numbers $h_4^1$ into "flight from Denver to Philadelphia" general intent numbers $h_5^1$, the detail encoder 872 at time step 5 converts the dictionary numbers $x_5$ for "Philadelphia" 810 and the "to" intent detail numbers $h_4^2$ into "Philadelphia" intent detail numbers $h_5^2$, and the suggestion encoder 874 at time step 5 converts the dictionary numbers $z_5$ for the vocabulary set 820 at time step 5 and the fourth vocabulary numbers $h_4^3$ into fifth vocabulary numbers $h_5^3$. The intent decoder 876 at time step 5 converts the "flight from Denver to Philadelphia" general intent numbers $h_5^1$, the "Philadelphia" intent detail numbers $h_5^2$, the fifth vocabulary numbers $h_5^3$, and the "flight from Denver to" intent state numbers $s_4^1$ into "flight from Denver to Philadelphia" general intent numbers $\hat{y}_5^1$ that determine a general intent class $y_{intent}^1$="flight." The detail decoder 878 at time step 5 converts the "flight from Denver to Philadelphia" general intent numbers $h_5^1$, the "Philadelphia" intent detail numbers $h_5^2$, the fifth vocabulary numbers $h_5^3$, and the "to" detail state numbers $s_4^2$ into "Philadelphia" intent detail numbers $\hat{y}_5^2$ that determine an intent detail tag $y_5^2$="to location." The suggestion decoder 880 at time step 5 converts the "flight from Denver to Philadelphia" general intent numbers $h_5^1$, the "Philadelphia" intent detail numbers $h_5^2$, the fifth vocabulary numbers $h_5^3$, and the fourth vocabulary state numbers $s_4^3$ into fifth vocabulary numbers $\hat{y}_5^3$ that determine a fifth vocabulary tag $y_5^3$=0. Then the natural language understanding engine 216 can respond to the user entering the text "flight from Denver to Philadelphia" by automatically suggesting the additional text entry options of $y_1^3$="ticket," $y_2^3$="status," $y_3^3$="time," and $y_4^3$="gate." Although FIG. 8 depicts an automatic-suggestion model within a tri-model structure, the automatic-suggestion may be incorporated as one model within a bi-model structure, with the other model combining the general intent model and the intent detail model into a text model.

The natural language server 206 can use additional signals for the visual-based question answering task. For example, the natural language server 206 can use an image model, a text questions model, and a speech signal model, which enables people to ask questions for a given image by both entering text and speaking. By sharing their hidden state information, these three models can work concurrently to improve the performance of a visual-based query answering task by taking advantage the important information from three different data sources.

Figure 9:
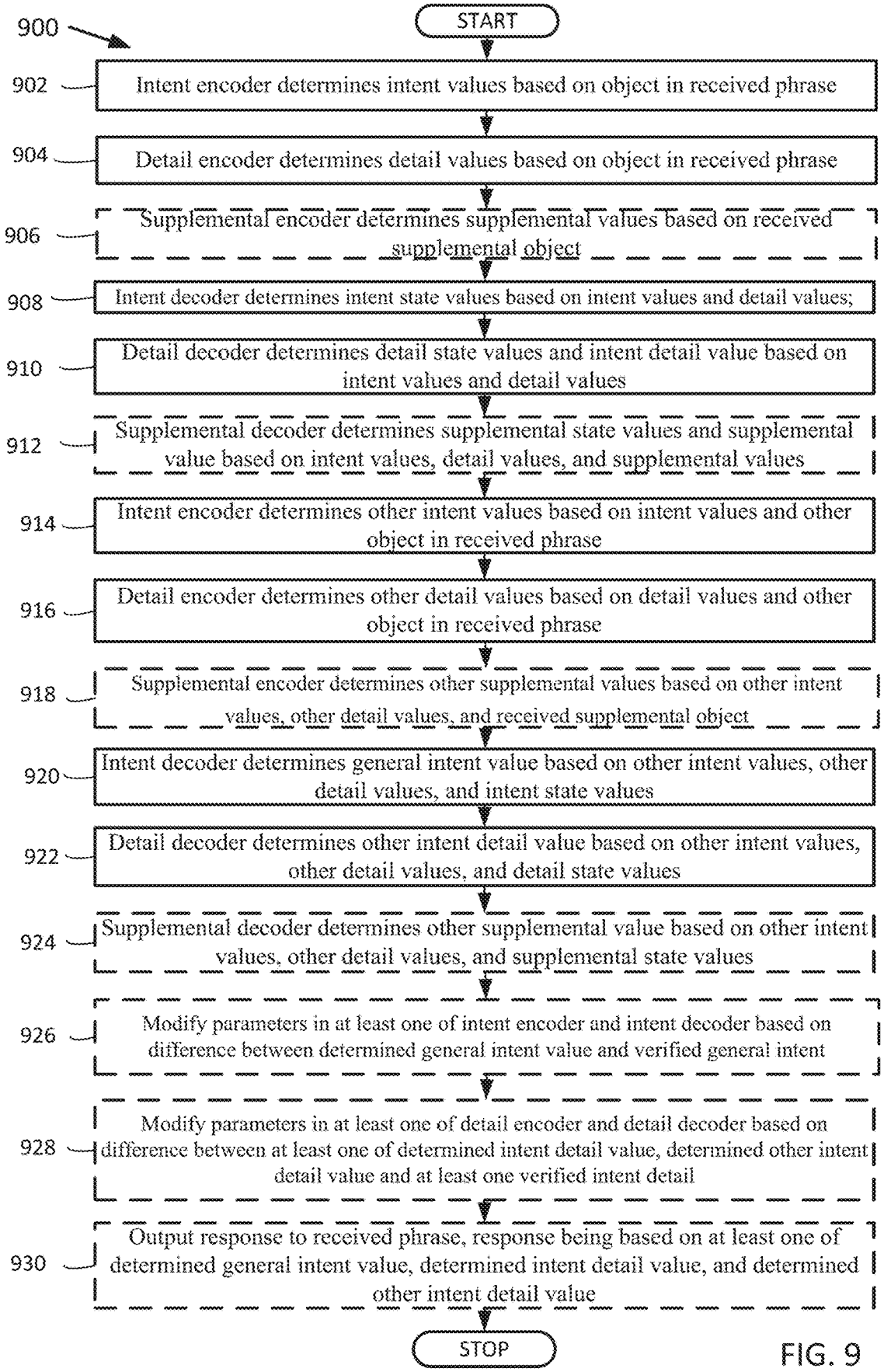
FIG. 9 is a flowchart that illustrates a method for multi-models that understand natural language phrases according to an embodiment.

FIG. 9 is a flowchart that illustrates a method for multi-models that understand natural language phrases according to an embodiment. Flowchart 900 illustrates method acts illustrated as flowchart blocks for certain steps involved in and/or between the clients 202-204 and/or the servers 206-208 of FIG. 2.

An intent encoder determines intent values based on an object in a received phrase, block 902. The system converts the dictionary numbers for a word from an input phrase into general intent numbers. For example, and without limitation, this may include the intent encoder 330 at training stage 4 converting dictionary numbers $x_4$ for "to" 308 and the "flight from Denver" general intent numbers $h_3^1$ into "flight from Denver to" general intent numbers $h_4^1$. Based on the example models depicted by FIG. 4, the intent encoder 436 at time step 4 converts dictionary numbers $x_4$ for "of" 408 and the "check the price" general intent numbers $h_3^1$ into "check the price of" general intent numbers $h_4^1$.

Based on the example models depicted by FIG. 6, the intent encoder 626 at time step 2 converts dictionary numbers $x_2$ for "many" 604 and the "how" general intent numbers $h_1^1$ into "how many" general intent numbers $h_2^1$. Based on the example models depicted by FIG. 7, the intent encoder 742 at time step 3 converts dictionary numbers $x_3$ for "litigation" 706 and the "when is" general intent numbers $h_2^1$ into "when is litigation" general intent numbers $h_3^1$. Based on the example models depicted by FIG. 8, the intent encoder 858 at time step 4 converts dictionary numbers $x_4$ for "to" 808 and the "flight from Denver" general intent numbers $h_3^1$ into "flight from Denver to" general intent numbers $h_4^1$.

While generating general intent numbers, a detail encoder determines detail values based on the object in the received phrase, block 904. The system converts the dictionary numbers for a word from an input phrase into intent detail numbers. By way of example and without limitation, this may include the detail encoder 332 at training stage 4 converting the dictionary numbers $x_4$ for "to" 308 and the "Denver" intent detail numbers $h_3^2$ into "to" intent detail numbers $h_4^2$. Based on the example models depicted by FIG. 4, the detail encoder 438 at time step 4 converts the dictionary numbers $x_4$ for "of" 408 and the "price" intent detail numbers $h_3^2$ into "of" intent detail numbers $h_4^2$.

Based on the example models depicted by FIG. 6, the detail encoder 628 at time step 2 converts the dictionary numbers $x_2$ for "many" 604 and the "how" intent detail numbers $h_1^2$ into "many" intent detail numbers $h_2^2$. Based on the example models depicted by FIG. 7, the detail encoder 744 at time step 3 converts the dictionary numbers $x_3$ for "litigation" 706 and the "is" intent detail numbers $h_2^2$ into "litigation" intent detail numbers $h_3^2$. Based on the example models depicted by FIG. 8, the detail encoder 860 at time step 4 converts the dictionary numbers $x_4$ for "to" 808 and the "Denver" intent detail numbers $h_3^2$ into "to" intent detail numbers $h_4^2$.

During the generation of numbers for general intent and an intent detail, a supplemental encoder optionally determines supplemental values based on a received supplemental object, block 906. The system converts the dictionary numbers for another object into other numbers, such as image, audio, or suggestion numbers. In embodiments, this may include the image encoder 630 at time step 2 converting the dictionary numbers $z_2$ for a texture layer 610 and the color image numbers $h_1^3$ into texture image numbers $h_2^3$. Based on the example models depicted by FIG. 7, the audio encoder 746 at time step 3 converts the audio numbers $z_3$ for the third hour of recording 714 and the second hour audio numbers $h_2^3$ into third hour audio numbers $h_3^3$. Based on the example models depicted by FIG. 8, the suggestion encoder 862 at time step 4 converts the dictionary numbers $z_4$ for the vocabulary set 818 at time step 4 and the third vocabulary numbers $h_3^3$ into fourth vocabulary numbers $h_4^3$.

Having generated intent values and detail values, an intent decoder determines intent state values based on the intent values and the detail values, block 908. The system converts the hidden states into general intent state numbers. For example, and without limitation, this may include the intent decoder 334 at training stage 4 converting the "flight from Denver to" general intent numbers $h_4^1$, the "to" intent detail numbers $h_4^2$, and the "flight from Denver" intent state numbers $s_3^1$ into "flight from Denver to" intent state numbers $s_4^1$. Based on the example models depicted by FIG. 4, the intent decoder 440 at time step 4 converts the "check the price of" general intent numbers $h_4^1$, the "of" intent detail numbers $h_4^2$, and the "check the price" intent state numbers $s_3^1$ into "check the price of" intent state numbers $s_4^1$.

Based on the example models depicted by FIG. 6, the intent decoder 632 at time step 2 converts the "how many" general intent numbers $h_2^1$, the "many" intent detail numbers $h_2^2$, the texture image numbers $h_2^3$, and the "how" intent state numbers $s_1^1$ into "how many" intent state numbers $s_2^1$. Based on the example models depicted by FIG. 7, the intent decoder 748 at time step 3 converts the "when is litigation" general intent numbers $h_3^1$, the "litigation" intent detail numbers $h_3^2$, the third hour audio numbers $h_3^3$, and the "when is" intent state numbers $s_2^1$ into "when is litigation" intent state numbers $s_3^1$. Based on the example models depicted by FIG. 8, the intent decoder 864 at time step 4 converts the "flight from Denver to" general intent numbers $h_4^1$, the "to" intent detail numbers $h_4^2$, the fourth vocabulary numbers $h_4^3$, and the "flight from Denver" intent state numbers $s_3^1$ into "flight from Denver to" intent state numbers $s_4^1$.

After generating intent values and detail values, a detail decoder determines detail state values and an intent detail value based on the intent values and the detail values, block 910. The system converts the hidden states into intent detail state numbers and an intent detail tag. By way of example and without limitation, this may include the detail decoder 348 at training stage 4 converting the "flight from Denver to" general intent numbers $h_4^1$, the "to" intent detail numbers $h_4^2$, and the "flight" detail state numbers $s_3^2$ into "to" detail state numbers $s_4^2$ and intent detail numbers $\hat{y}_4^2$ that determine the intent detail tag $y_4^2=0$. Based on the example models depicted by FIG. 4, the detail decoder 442 at time step 4 converts the "check the price of" general intent numbers $h_4^1$, the "of" intent detail numbers $h_4^2$, and the "price" detail state numbers $s_3^2$ into "of" detail state numbers $s_4^2$ and "of" intent detail numbers $\hat{y}_4^2$ that determine an intent detail tag $y_4^2=0$.

Based on the example models depicted by FIG. 6, the detail decoder 634 at time step 2 converts the "how many" general intent numbers $h_2^1$, the "many" intent detail numbers $h_2^2$, the texture image numbers $h_2^3$, and the "how" detail state numbers $s_1^2$ into "many" detail state numbers $s_2^2$ and "many" intent detail numbers $\hat{y}_2^2$ that have an intent detail tag $y_2^2=0$. Based on the example models depicted by FIG. 7, the detail decoder 750 at time step 3 converts the "when is litigation" general intent numbers $h_3^1$, the "litigation" intent detail numbers $h_3^2$, the third hour audio numbers $h_3^3$, and the "is" detail state numbers $s_2^2$ into "litigation" intent state numbers $s_3^2$ and "litigation" intent detail numbers $\hat{y}_3^2$ that determine an intent detail tag $y_3^2$="topic." Based on the example models depicted by FIG. 8, the detail decoder 866 at time step 4 converts the "flight from Denver to" general intent numbers $h_4^1$, the "to" intent detail numbers $h_4^2$, the fourth vocabulary numbers $h_4^3$, and the "flight" detail state numbers $s_3^2$ into "to" detail state numbers $s_4^2$ and "to" intent detail numbers $\hat{y}_4^2$ that determine an intent detail tag $y_4^2=0$.

Following the generation of intent values and detail values, a supplemental decoder optionally determines supplemental state values and a supplemental value based on the intent values, the detail values, and the supplemental values, block 912. The system converts the hidden states into state numbers and a tag for another model, such as an image, an audio, or a suggestion model. In embodiments, this may include the image decoder 636 at time step 2 converting the "how many" general intent numbers $h_2^1$, the "many" intent detail numbers $h_2^2$, the texture image numbers $h_2^3$, and the "how" image state numbers $s_1^2$ into "many" image state numbers $s_2^3$ and a texture attention map 2 $y_2^3$ that includes a surfer 2 tag.

Based on the example models depicted by FIG. 7, the audio decoder 752 at time step 3 converts the "when is litigation" general intent numbers $h_3^1$, the "litigation" intent detail numbers $h_3^2$, the third hour audio numbers $h_3^3$, and the second hour audio state numbers $s_2^3$ into third hour audio state numbers $s_3^3$, and third hour audio numbers $\hat{y}_3^3$ that determine a third hour audio tag $y_3^3=0$. Based on the example models depicted by FIG. 8, the suggestion decoder 868 at time step 4 converts the "flight from Denver to" general intent numbers $h_4^1$, the "to" intent detail numbers $h_4^2$, the fourth vocabulary numbers $h_4^3$, and the third vocabulary state numbers $s_3^3$ into fourth vocabulary state numbers $s_4^3$ and fourth vocabulary numbers $\hat{y}_4^3$ that determine a fourth vocabulary tag $y_4^3$="gate."

Having decoded some values, the intent encoder determines other intent values based on the intent values and another object in the received phrase, block 914. The system converts the dictionary numbers for a word from an input phrase into general intent numbers. For example, and without limitation, this may include the intent encoder 336 at training stage 5 converting dictionary numbers $x_5$ for "Philadelphia" 310 and the "flight from Denver to" general intent numbers $h_4^1$ into "flight from Denver to Philadelphia" general intent numbers $h_5^1$. Based on the example models depicted by FIG. 4, the intent encoder 444 at time step 5 converts dictionary numbers $x_5$ for "Apple" 410 and the "check the price of" general intent numbers $h_4^1$ into "check the price of Apple" general intent numbers $h_5^1$.

Based on the example models depicted by FIG. 6, the intent encoder 638 at time step 3 converts dictionary numbers $x_3$ for "surfers" 606 and the "how many" general intent numbers $h_2^1$ into "how many surfers" general intent numbers $h_3^1$. Based on the example models depicted by FIG. 7, the intent encoder 752 at time step 4 converts dictionary numbers $x_4$ for "discussed" 708 and the "when is litigation" general intent numbers $h_3^1$ into "when is litigation discussed" general intent numbers $h_4^1$. Based on the example models depicted by FIG. 8, the intent encoder 870 at time step 5 converts dictionary numbers $x_5$ for "Philadelphia" 810 and the "flight from Denver to" general intent numbers $h_4^1$ into "flight from Denver to Philadelphia" general intent numbers $h_5^1$.

After decoding some values, the detail encoder determines other detail values based on detail values and another object in the received phrase, block 916. The system converts the dictionary numbers for a word from an input phrase into intent detail numbers. By way of example and without limitation, this may include the detail encoder 338 at training stage 5 converting the dictionary numbers $x_5$ for "Philadelphia" 310 and the "to" intent detail numbers $h_4^2$ into "Philadelphia" intent detail numbers $h_5^2$. Based on the example models depicted by FIG. 4, the detail encoder 446 at time step 5 converts the dictionary numbers $x_5$ for "Apple" 310 and the "of" intent detail numbers $h_4^2$ into "Apple" intent detail numbers $h_5^2$.

Based on the example models depicted by FIG. 6, the detail encoder 640 at time step 3 converts the dictionary numbers $x_3$ for "surfers" 606 and the "many" intent detail numbers $h_2^2$ into "surfers" intent detail numbers $h_3^2$. Based on the example models depicted by FIG. 7, the detail encoder 754 at time step 4 converts the dictionary numbers $x_4$ for "discussed" 708 and the "litigation" intent detail numbers $h_3^2$ into "discussed" intent detail numbers $h_4^2$. Based on the example models depicted by FIG. 8, the detail encoder 872 at time step 5 converts the dictionary numbers $x_5$ for "Philadelphia" 810 and the "to" intent detail numbers $h_4^2$ into "Philadelphia" intent detail numbers $h_5^2$.

Following the decoding of some values, the supplemental encoder optionally determines other supplemental values based on the other intent values, the other detail values, and a received supplemental object, block 918. The system converts the dictionary numbers for another object into other numbers, such as image, audio, or suggestion numbers. In embodiments, this may include the image encoder 642 at time step 3 converting the dictionary numbers $z_3$ for a contrast layer 612 and the "many" image numbers $h_2^3$ into contrast image numbers $h_3^3$.

Based on the example models depicted by FIG. 7, the audio encoder 756 at time step 4 converts the audio numbers $z_4$ for the fourth hour of recording 716 and the third hour audio numbers $h_3^3$ into fourth hour audio numbers $h_4^3$. Based on the example models depicted by FIG. 8, the suggestion encoder 874 at time step 5 converts the dictionary numbers $z_5$ for the vocabulary set 820 at time step 5 and the fourth vocabulary numbers $h_4^3$ into fifth vocabulary numbers $h_5^3$.

Having generated intent values and detail values, the intent decoder determines a general intent value based on the other intent values, the other detail values, and intent state values, block 920. The system identifies the general intent. For example, and without limitation, this may include the intent decoder 340 at training stage 5 converting the "flight from Denver to Philadelphia" general intent numbers $h_5^1$, the "Philadelphia" intent detail numbers $h_5^2$, and the "flight from Denver to" intent state numbers $s_4^1$ into general intent numbers $\hat{y}_5^1$, which determine a general intent class $y_{intent}^1$.="flight." Based on the example models depicted by FIG. 4, the intent decoder 448 at time step 5 converts the "check the price of Apple" general intent numbers $h_5^1$, the "Apple" intent detail numbers $h_5^2$, and the "check the price of" intent state numbers $s_4^1$ into general intent numbers $\hat{y}_5^1$ that determine the general intent class $y_{intent}^1$="check stock price" or "check fruit price."

Based on the example models depicted by FIG. 6, the intent decoder 644 at time step 3 converts the "how many surfers" general intent numbers $h_3^1$, the "surfers" intent detail numbers $h_3^2$, the contrast image numbers $h_3^3$, and the "many" intent state numbers $s_2^1$ into "how many surfers" general intent state numbers $\hat{y}_3^1$, which determine a general intent class $y_{intent}^1$="count." Based on the example models depicted by FIG. 7, the intent decoder 758 at time step 4 converts the "when is litigation discussed" general intent numbers $h_4^1$, the "discussed" intent detail numbers $h_4^2$, the fourth hour audio numbers $h_4^3$, and the "when is litigation" intent state numbers $s_3^1$ into "when is litigation discussed" general intent numbers $\hat{y}_4^1$, which determine a general intent class $y_{intent}^1$="time." Based on the example models depicted by FIG. 8, the intent decoder 876 at time step 5 converts the "flight from Denver to Philadelphia" general intent numbers $h_5^1$, the "Philadelphia" intent detail numbers $h_5^2$, the fifth vocabulary numbers $h_5^3$, and the "flight from Denver to" intent state numbers $s_4^1$ into "flight from Denver to Philadelphia" general intent numbers $\hat{y}_5^1$ that determine a general intent class $y_{intent}^1$="flight."

After generating intent values and detail values, the detail decoder determines another intent detail value based on the other intent values, the other detail values, and the detail state values, block 922. The system converts the hidden states into intent detail state numbers and an intent detail tag. By way of example and without limitation, this may include the detail decoder 350 at training stage 5 converting the "flight from Denver to Philadelphia" general intent numbers $h_5^1$, the "Philadelphia" intent detail numbers $h_5^2$, and the "to" detail state numbers $s_4^2$ into intent detail numbers $\hat{y}_5^2$ that determine an intent detail tag $y_5^2$="to location." Based on the example models depicted by FIG. 4, the detail decoder 450 at time step 5 converts the "check the price of Apple" general intent numbers $h_5^1$, the "Apple" intent detail numbers $h_5^2$, and the "of" detail state numbers $s_4^2$ into intent detail numbers $\hat{y}_5^2$ that determine an intent detail tag $y_5^2$="company name" or "fruit name."

Based on the example models depicted by FIG. 6, the detail decoder 646 at time step 3 converts the "how many surfers" general intent numbers $h_3^1$, the "surfers" intent detail numbers $h_3^2$, the contrast image numbers $h_3^3$, and the "many" detail state numbers $s_2^2$ into "surfers" intent detail numbers $\hat{y}_3^2$ that determine an intent detail tag $y_3^2$="surfers." Based on the example models depicted by FIG. 7, the detail decoder 760 at time step 5 converts the "when is litigation discussed" general intent numbers $h_4^1$, the "discussed" intent detail numbers $h_4^2$, the fourth hour audio numbers $h_4^3$, and the "litigation" detail state numbers $s_3^2$ into "discussed" intent detail numbers $\hat{y}_4^2$, which determine an intent detail tag $y_4^2$=0. Based on the example models depicted by FIG. 8, the detail decoder 878 at time step 5 converts the "flight from Denver to Philadelphia" general intent numbers $h_5^1$, the "Philadelphia" intent detail numbers $h_5^2$, the fifth vocabulary numbers $h_5^3$, and the "to" detail state numbers $s_4^2$ into "Philadelphia" intent detail numbers $\hat{y}_5^2$ that determine an intent detail tag $y_5^2$="to location."

In addition to determining the general intent, the supplemental decoder optionally determines other supplemental value based on the other intent values, the other detail values, and the supplemental state values, block 924. The system converts the hidden states into a tag for another model, such as an image, an audio recording, or an automatic-suggestion. In embodiments, this may include the image decoder 648 at time step 3 converts the "how many surfers" general intent numbers $h_3^1$, the "surfers" intent detail numbers $h_3^2$, the contrast image numbers $h_3^3$, and the texture image numbers $s_2^3$ into a contrast attention map 3 $y_3^3$ that includes a surfer 1 tag and a surfer 2 tag.

Based on the example models depicted by FIG. 7, the audio decoder 762 at time step 4 converts the "when is litigation discussed" general intent numbers $h_4^1$, the "discussed" intent detail numbers $h_4^2$, the fourth hour audio numbers $h_4^3$, and the third hour audio state numbers $s_3^3$ into fourth hour audio numbers $\hat{y}_4^3$, which determine a fourth hour audio tag $y_4^3$="3:19 to 3:38." Based on the example models depicted by FIG. 8, the suggestion decoder 880 at time step 5 converts the "flight from Denver to Philadelphia" general intent numbers $h_5^1$, the "Philadelphia" intent detail numbers $h_5^2$, the fifth vocabulary numbers $h_5^3$, and the fourth vocabulary state numbers $s_4^3$ into fifth vocabulary numbers $\hat{y}_5^3$ that determine a fifth vocabulary tag $y_5^3$=0.

Following the determination of the general intent value, parameters are optionally modified in the intent encoder and/or the intent decoder based on a difference between the determined general intent value and a verified general intent, block 926. The system trains the general intent model based on the correctness of the general intent class. For example, and without limitation, this may include the trainer 212 computing the loss function based on $y_{intent}^1$="flight," and a system administrator verifying the general intent class "flight" for the phrase "Flight from Denver to Philadelphia." Therefore, the trainer 212 makes minimal, if any, changes in the parameters for the intent encoder or the intent decoder.

Having determined various intent detail values, parameters are optionally modified in the detail encoder and/or the detail decoder based on a difference between the determined intent detail value and/or the determined other intent detail value and at least one verified intent detail, block 928. The system trains the intent detail model based on the correctness of the intent detail tags. By way of example and without limitation, this may include the trainer 212 computing the loss function based on $y_1^2$="0," $y_3^2$="from location," $y_5^2$="to location," and a system administrator verifying only the intent detail tags "from location" and "to location" for the phrase "Flight from Denver to Philadelphia." Therefore, the trainer 212 makes changes in the parameters for the detail encoder and/or the detail decoder to reduce the probabilities of generating the intent detail tag $y_1^2$="0."

After the multiple models understand the received phrase, a response to the received phrase is optionally output, the response being based on the determined general intent value, the determined intent detail value, and/or the determined other intent detail value, block 930. The system outputs a response to the natural language phrase understood by the multiple models. In embodiments, this may include the natural language understanding engine 216 responding to the user with the reply, "When do you want to order delivery of the fruit apple?" or the reply, "How much stock do you want to purchase in the company Apple?""

Based on the example models depicted by FIG. 6, the natural language understanding engine 216 responds to the user with a count of "2 surfers" in the image provided by the user, and uses the attention maps 1-3 to identify the location of the tagged surfers 1 and 2. Based on the example models depicted by FIG. 7, the natural language understanding engine 216 responds to the user with the reply "the audio recording includes a discussion of litigation from 3:19 to 3:38," thereby saving the user more than three hours of time that would have been spent listening to the first three hours and 19 minutes of the audio recording. Based on the example models depicted by FIG. 8, the natural language understanding engine 216 responds to the user entering the text "flight from Denver to Philadelphia" by automatically suggesting the additional text entry options of $y_1^3$="ticket," $y_2^3$="status," $y_3^3$="time," and $y_4^3$="gate."

Although FIG. 9 depicts the blocks 902-930 occurring in a specific order, the blocks 902-930 may occur in another order. In other implementations, each of the blocks 902-930 may also be executed in combination with other blocks and/or some blocks may be divided into a different set of blocks.

Figure 10:
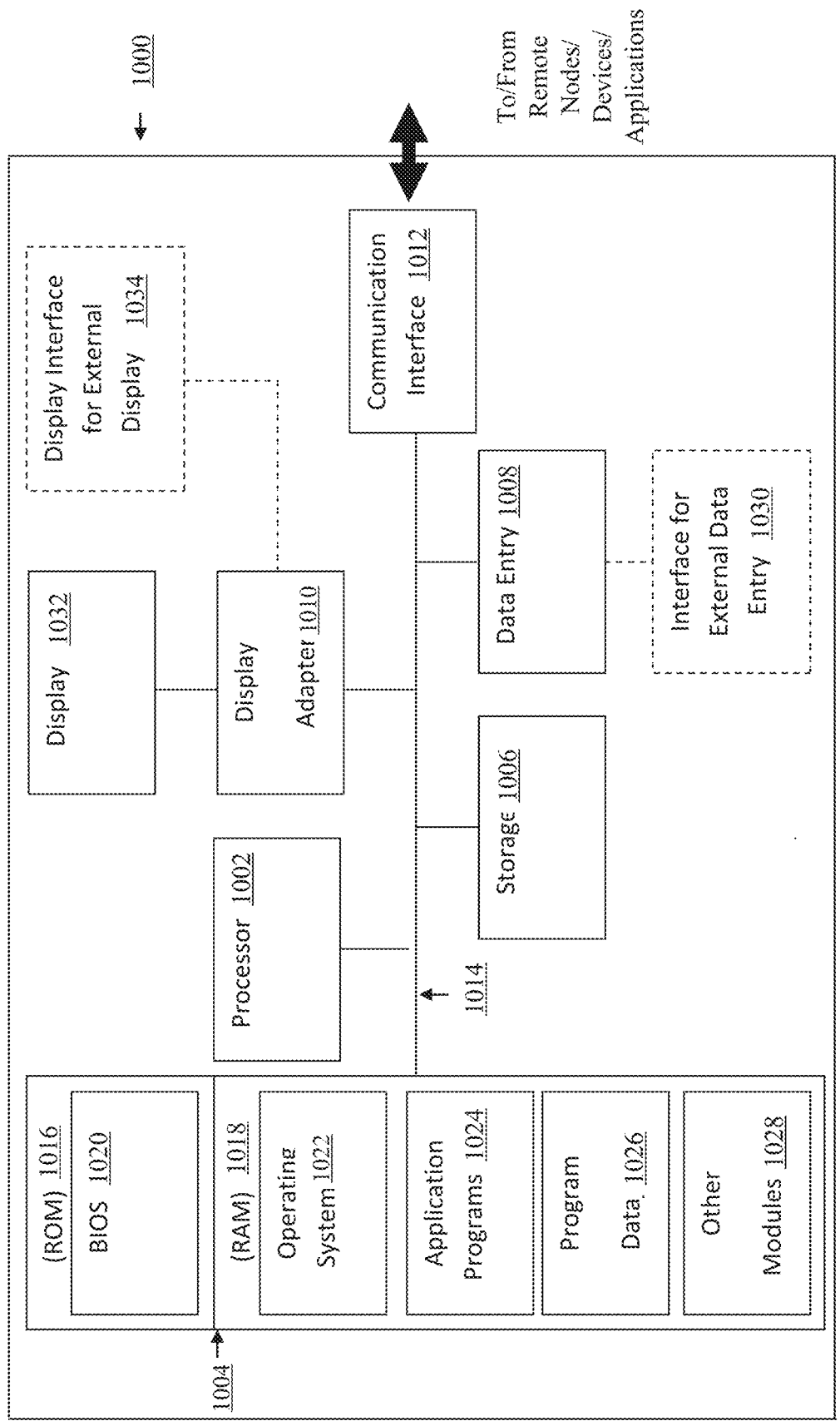
FIG. 10 is a block diagram illustrating an example hardware device in which the subject matter may be implemented.

An exemplary hardware device in which the subject matter may be implemented shall be described. Those of ordinary skill in the art will appreciate that the elements illustrated in FIG. 10 may vary depending on the system implementation. With reference to FIG. 10, an exemplary system for implementing the subject matter disclosed herein includes a hardware device 1000, including a processing unit 1002, a memory 1004, a storage 1006, a data entry module 1008, a display adapter 1010, a communication interface 1012, and a bus 1014 that couples elements 1004-1012 to the processing unit 1002.

The bus 1014 may comprise any type of bus architecture. Examples include a memory bus, a peripheral bus, a local bus, etc. The processing unit 1002 is an instruction execution machine, apparatus, or device and may comprise a microprocessor, a digital signal processor, a graphics processing unit, an application specific integrated circuit (ASIC), a field programmable gate array (FPGA), etc. The processing unit 1002 may be configured to execute program instructions stored in the memory 1004 and/or the storage 1006 and/or received via the data entry module 1008.

The memory 1004 may include a read only memory (ROM) 1016 and a random access memory (RAM) 1018. The memory 1004 may be configured to store program instructions and data during operation of the device 1000. In various embodiments, the memory 1004 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 1004 may also include nonvolatile memory technologies such as nonvolatile flash RAM (NVRAM) or ROM. In some embodiments, it is contemplated that the memory 1004 may include a combination of technologies such as the foregoing, as well as other technologies not specifically mentioned. When the subject matter is implemented in a computer system, a basic input/output system (BIOS) 1020, containing the basic routines that help to transfer information between elements within the computer system, such as during start-up, is stored in the ROM 1016.

The storage 1006 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1000.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1006, the ROM 1016 or the RAM 1018, including an operating system 1022, one or more applications programs 1024, program data 1026, and other program modules 1028. A user may enter commands and information into the hardware device 1000 through data entry module 1008. The data entry module 1008 may include mechanisms such as a keyboard, a touch screen, a pointing device, etc. Other external input devices (not shown) are connected to the hardware device 1000 via an external data entry interface 1030. By way of example and not limitation, external input devices may include a microphone, joystick, game pad, satellite dish, scanner, or the like. In some embodiments, external input devices may include video or audio input devices such as a video camera, a still camera, etc. The data entry module 1008 may be configured to receive input from one or more users of the device 1000 and to deliver such input to the processing unit 1002 and/or the memory 1004 via the bus 1014.

A display 1032 is also connected to the bus 1014 via the display adapter 1010. The display 1032 may be configured to display output of the device 1000 to one or more users. In some embodiments, a given device such as a touch screen, for example, may function as both the data entry module 1008 and the display 1032. External display devices may also be connected to the bus 1014 via the external display interface 1034. Other peripheral output devices, not shown, such as speakers and printers, may be connected to the hardware device 1000.

The hardware device 1000 may operate in a networked environment using logical connections to one or more remote nodes (not shown) via the communication interface 1012. The remote node may be another computer, a server, a router, a peer device or other common network node, and typically includes many or all of the elements described above relative to the hardware device 1000. The communication interface 1012 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1012 may include logic configured to support direct memory access (DMA) transfers between the memory 1004 and other devices.

In a networked environment, program modules depicted relative to the hardware device 1000, or portions thereof, may be stored in a remote storage device, such as, for example, on a server. It will be appreciated that other hardware and/or software to establish a communications link between the hardware device 1000 and other devices may be used.

It should be understood that the arrangement of the hardware device 1000 illustrated in FIG. 10 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 1000.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 10.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions, which when executed cause the one or more processors to:
   determine, by an intent encoder, intent values based on an object in a received phrase;
   determine, by a detail encoder, detail values based on the object in the received phrase;
   determine, by an intent decoder, intent state values based on the intent values and the detail values;

determine, by a detail decoder, detail state values and an intent detail value based on the intent values and the detail values;

determine, by the intent encoder, other intent values based on the intent values and another object in the received phrase;

determine, by the detail encoder, other detail values based on the detail values and the other object in the received phrase;

determine, by the intent decoder, a general intent value based on the other intent values, the other detail values, and the intent state values; and determine, by the detail decoder, another intent detail value based on the other intent values, the other detail values, and the detail state values.

2. The system of claim 1, wherein the plurality of instructions, when executed, further cause the one or more processors to at least one of:

modify parameters in at least one of the intent encoder and the intent decoder based on a difference between the determined general intent value and a verified general intent; and modify parameters in at least one of the detail encoder and the detail decoder based on a difference between at least two of the determined intent detail value, the determined other intent detail value and at least one verified intent detail.

3. The system of claim 1, wherein the plurality of instructions, when executed, further cause the one or more processors to output a response to the received phrase, the response based on at least one of the determined general intent value, the determined intent detail value, and the determined other intent detail value.

4. The system of claim 1, wherein the plurality of instructions, when executed, will further cause the one or more processors to:

determine, by a supplemental encoder, supplemental values based on a received supplemental object;

determine, by a supplemental decoder, supplemental state values and an additional supplemental value based on the intent values, the detail values, and the supplemental values;

determine, by the supplemental encoder, other supplemental values based on the intent values, the detail values, and the received supplemental object; and determine, by the supplemental decoder, another additional supplemental value based on the other intent values, the other detail values, and the supplemental state values.

5. The system of claim 4, wherein the supplemental encoder comprises an image encoder, the supplemental values comprise image values, the received supplemental object comprises an image object, the supplemental decoder comprises an image decoder, the supplemental state values comprise image state values, the additional supplemental value comprises an additional image value, the other supplemental values comprise other image values, and the other additional supplemental value comprises another additional image value.

6. The system of claim 4, wherein one of the supplemental encoder comprises an audio encoder, the supplemental values comprise audio values, the received supplemental object comprises an audio object, the supplemental decoder comprises an audio decoder, the supplemental state values comprise audio state values, the additional supplemental value comprises an additional audio value, the other supplemental values comprise other audio values, and the other additional supplemental value comprises another additional audio value, and the supplemental encoder comprises a suggestion encoder, the supplemental values comprise suggestion values, the received supplemental object comprises a suggestion object, the supplemental decoder comprises a suggestion decoder, the supplemental state values comprise suggestion state values, the additional supplemental value comprises an additional suggestion value, the other supplemental values comprise other suggestion values, and the other additional supplemental value comprises another additional suggestion value.

7. A method comprising:

determining, by an intent encoder, intent values based on an object in a received phrase;

determining, by a detail encoder, detail values based on the object in the received phrase;

determining, by an intent decoder, intent state values based on the intent values and the detail values;

determining, by a detail decoder, detail state values and an intent detail value based on the intent values and the detail values;

determining, by the intent encoder, other intent values based on the intent values and another object in the received phrase;

determining, by the detail encoder, other detail values based on the detail values and the other object in the received phrase;

determining, by the intent decoder, a general intent value based on the other intent values, the other detail values, and the intent state values; and determining, by the detail decoder, another intent detail value based on the other intent values, the other detail values, and the detail state values.

8. The method of claim 7, wherein the method further comprises at least one of:

modifying parameters in at least one of the intent encoder and the intent decoder based on a difference between the determined general intent value and a verified general intent; and modifying parameters in at least one of the detail encoder and the detail decoder based on a difference between at least two of the determined intent detail value, the determined other intent detail value, and at least one verified intent detail.

9. The method of claim 7, wherein the method further comprises outputting a response to the received phrase, the response based on at least one of the determined general intent value, the determined intent detail value, and the determined other intent detail value.

10. The method of claim 7, wherein the method further comprises:

determining, by a supplemental encoder, supplemental values based on a received supplemental object;

determining, by a supplemental decoder, supplemental state values and an additional supplemental value based on the intent values, the detail values, and the supplemental values;

determining, by the supplemental encoder, other supplemental values based on the intent values, the detail values, and the received supplemental object; and determining, by the supplemental decoder, another additional supplemental value based on the other intent values, the other detail values, and the supplemental state values.

11. The method of claim 10, wherein the supplemental encoder comprises an image encoder, the supplemental values comprise image values, the received supplemental object comprises an image object, the supplemental decoder comprises an image decoder, the supplemental state values comprise image state values, the additional supplemental value comprises an additional image value, the other supplemental values comprise other image values, and the other additional supplemental value comprises another additional image value.

12. The method of claim 10, wherein one of the supplemental encoder comprises an audio encoder, the supplemental values comprise audio values, the received supplemental object comprises an audio object, the supplemental decoder comprises an audio decoder, the supplemental state values comprise audio state values, the supplemental value comprises an audio value, the additional other supplemental values comprise other additional audio values, and the other additional supplemental value comprises another additional audio value, and the supplemental encoder comprises a suggestion encoder, the supplemental values comprise suggestion values, the received supplemental object comprises a suggestion object, the supplemental decoder comprises a suggestion decoder, the supplemental state values comprise suggestion state values, the additional supplemental value comprises an additional suggestion value, the other supplemental values comprise other suggestion values, and the other additional supplemental value comprises another additional suggestion value.

13. A method comprising:
    determining, by an intent encoder, intent values based on an object in a received phrase;
    determining, by a detail encoder, detail values based on the object in the received phrase;
    determining, by an intent decoder, intent state values based on the intent values and the detail values;
    determining, by the intent encoder, other intent values based on the intent values and another object in the received phrase;
    determining, by the detail encoder, other detail values based on the detail values and the other object in the received phrase;
    determining, by the intent decoder, a general intent value based on the other intent values, the other detail values, and the intent state values; and
    modifying parameters in at least one of the intent encoder and the intent decoder based on a difference between the determined general intent value and a verified general intent.

14. The method of claim 13, wherein the method further comprises:
    determining, by a detail decoder, detail state values and an intent detail value based on the intent values and the detail values;
    determining, by the detail decoder, another intent detail value based on the other intent values, the other detail values, and the detail state values; and
    modifying parameters in at least one of the detail encoder and the detail decoder based on a difference between at least two of the determined intent detail value, the determined other intent detail value, and at least one verified intent detail.

15. A computer program product comprising computer-readable program code to be executed by one or more processors when retrieved from a non-transitory computer-readable medium, the program code including instructions to:
    determine, by an intent encoder, intent values based on an object in a received phrase;
    determine, by a detail encoder, detail values based on the object in the received phrase;
    determine, by an intent decoder, intent state values based on the intent values and the detail values;
    determine, by a detail decoder, detail state values and an intent detail value based on the intent values and the detail values;
    determine, by the intent encoder, other intent values based on the intent values and another object in the received phrase;
    determine, by the detail encoder, other detail values based on the detail values and the other object in the received phrase;
    determine, by the intent decoder, a general intent value based on the other intent values, the other detail values, and the intent state values; and
    determine, by the detail decoder, another intent detail value based on the other intent values, the other detail values, and the detail state values.

16. The computer program product of claim 15, wherein the program code further includes instructions to at least one of:
    modify parameters in at least one of the intent encoder and the intent decoder based on a difference between the determined general intent value and a verified general intent; and
    modify parameters in at least one of the detail encoder and the detail decoder based on a difference between at least two of the determined intent detail value, the determined other intent detail value, and at least one verified intent detail.

17. The computer program product of claim 15, wherein the program code further includes instructions to output a response to the received phrase, the response based on at least one of the determined general intent value, the determined intent detail value, and the determined other intent detail value.

18. The computer program product of claim 15, wherein the program code further includes instructions to:
    determine, by a supplemental encoder, supplemental values based on a received supplemental object;
    determine, by a supplemental decoder, supplemental state values and an additional supplemental value based on the intent values, the detail values, and the supplemental values;
    determine, by the supplemental encoder, other supplemental values based on the intent values, the detail values, and the received supplemental object; and
    determine, by the supplemental decoder, another additional supplemental value based on the other intent values, the other detail values, and the supplemental state values.

19. The computer program product of claim 18, wherein the supplemental encoder comprises an image encoder, the supplemental values comprise image values, the received supplemental object comprises an image object, the supplemental decoder comprises an image decoder, the supplemental state values comprise image state values, the additional supplemental value comprises an additional image value, the other supplemental values comprise other image values, and the other additional supplemental value comprises another additional image value.

20. The computer program product of claim 18, wherein one of the supplemental encoder comprises an audio encoder, the supplemental values comprise audio values, the received supplemental object comprises an audio object, the supplemental decoder comprises an audio decoder, the supplemental state values comprise audio state values, the additional supplemental value comprises an additional audio value, the other supplemental values comprise other audio values, and the other additional supplemental value comprises another additional audio value, and the supplemental encoder comprises a suggestion encoder, the supplemental values comprise suggestion values, the received supplemental object comprises a suggestion object, the supplemental decoder comprises a suggestion decoder, the supplemental state values comprise suggestion state values, the additional supplemental value comprises an additional suggestion value, the other supplemental values comprise other suggestion values, and the other additional supplemental value comprises another additional suggestion value.

* * * * *